United States Patent [19]

Ina et al.

[11] Patent Number: 4,694,352

[45] Date of Patent: Sep. 15, 1987

[54] IMAGE INFORMATION PROCESSING SYSTEM

[75] Inventors: Kenzoh Ina; Masatoshi Otani; Kenichi Mishima, all of Yokohama, Japan

[73] Assignee: Canon Kabushiki Kaisha, Tokyo, Japan

[21] Appl. No.: 776,007

[22] Filed: Sep. 13, 1985

[30] Foreign Application Priority Data

Sep. 21, 1984 [JP] Japan ............................... 59-196576
Sep. 28, 1984 [JP] Japan ............................... 59-202013
Sep. 28, 1984 [JP] Japan ............................... 59-203149

[51] Int. Cl.⁴ .......................... H04N 1/32; H04N 1/41
[52] U.S. Cl. .................................. 358/257; 358/260; 358/287; 379/100; 382/55
[58] Field of Search ............... 358/256, 282, 287, 263, 358/257, 260, 261; 382/55; 379/100

[56] References Cited

U.S. PATENT DOCUMENTS

| 3,995,106 | 11/1976 | Wern | 358/263 |
| 4,315,282 | 2/1982 | Schumacher | 358/183 |
| 4,439,790 | 3/1984 | Yoshida | 358/256 |
| 4,466,123 | 8/1984 | Arai | 382/58 |
| 4,558,374 | 12/1985 | Kurata | 358/287 |

Primary Examiner—Howard W. Britton
Attorney, Agent, or Firm—Fitzpatrick, Cella, Harper & Scinto

[57] ABSTRACT

An image information processing system has reader for photoelectrically reading an image of an original and producing an image data. The image data produced by said reader is selectively encoded in accordance with the area designation.

16 Claims, 29 Drawing Figures

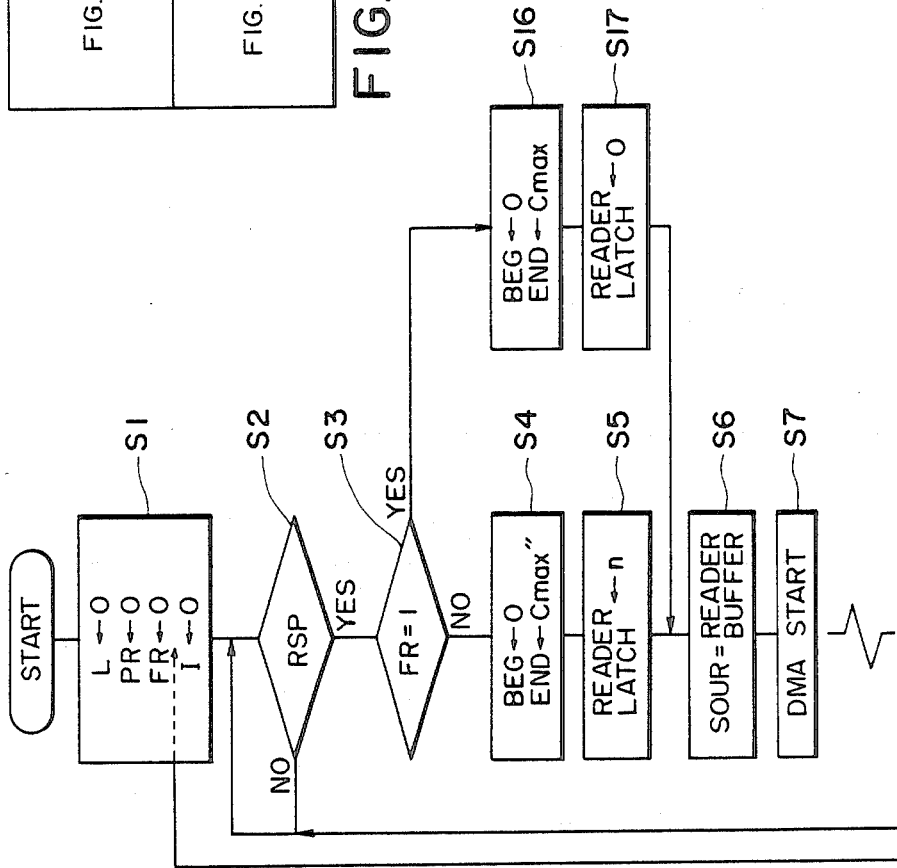
FIG. 12(a)A

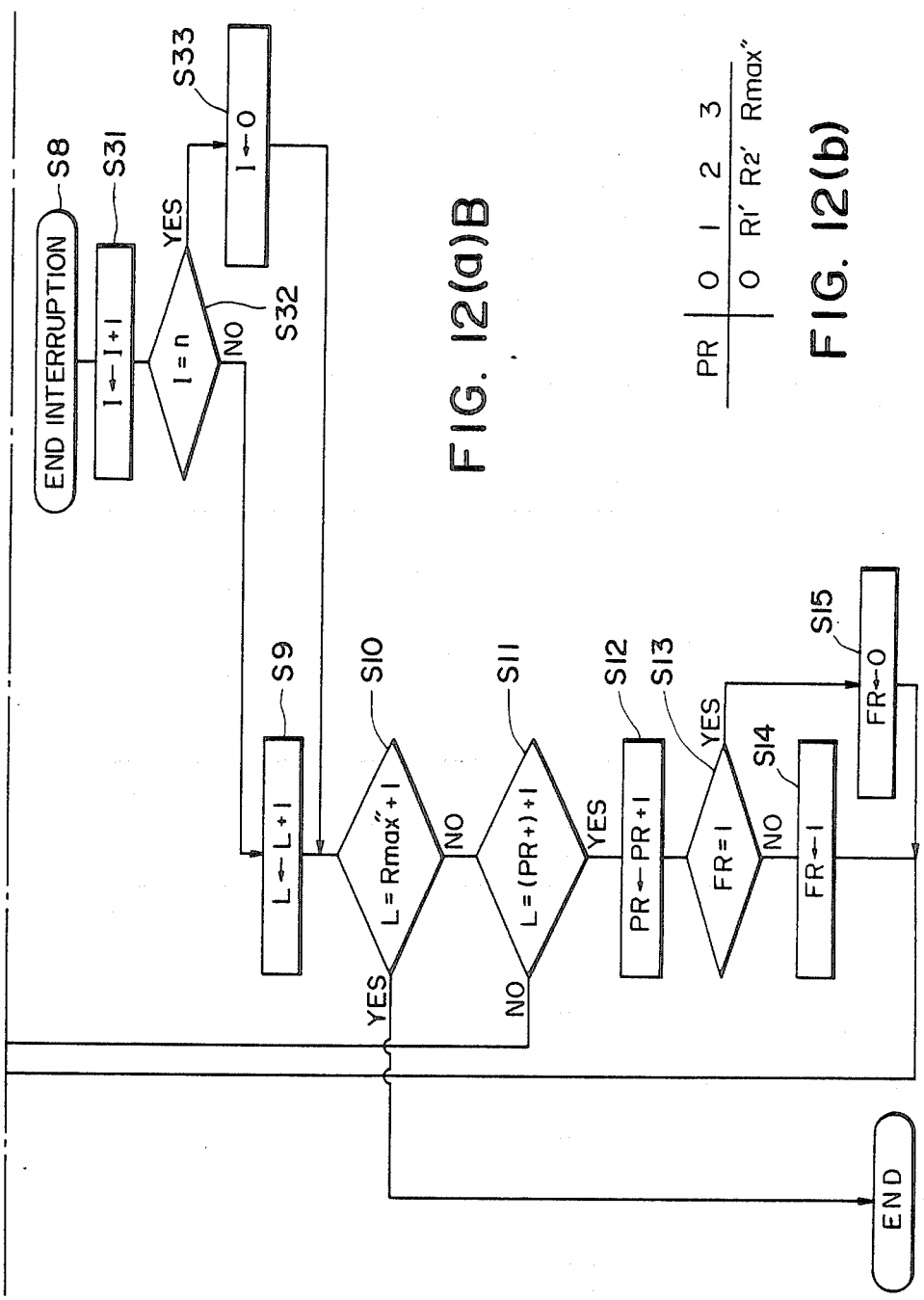

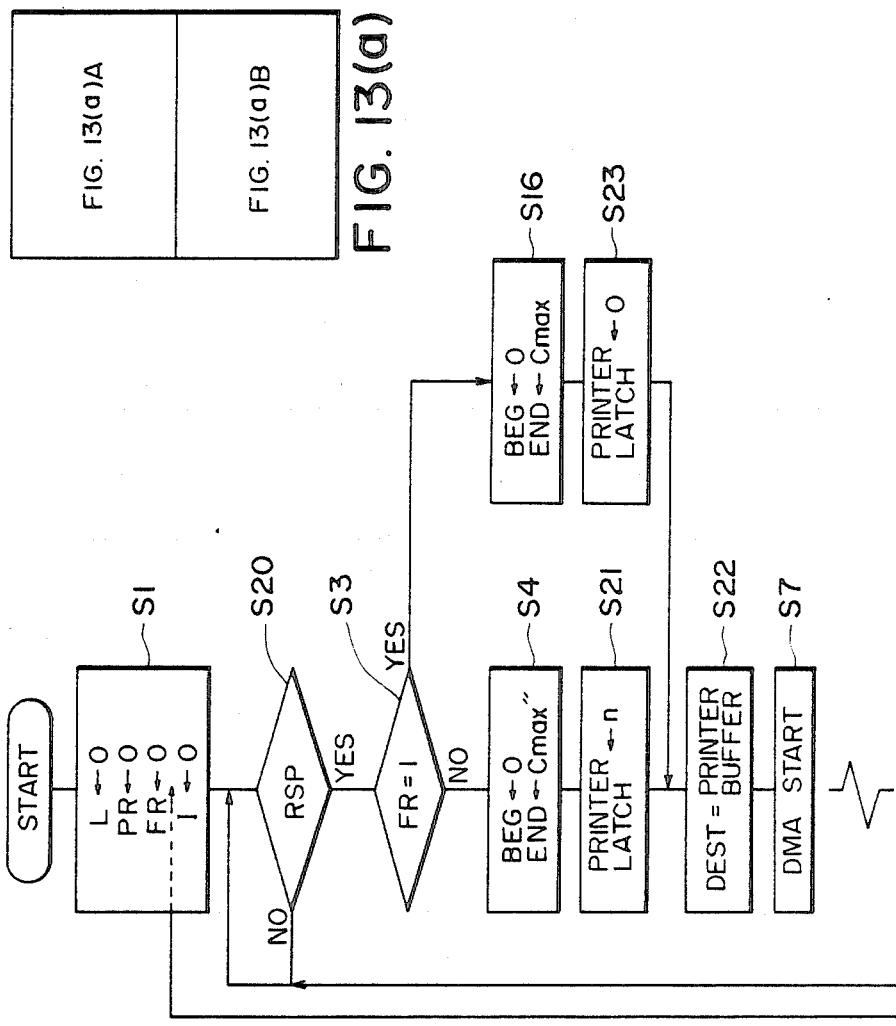

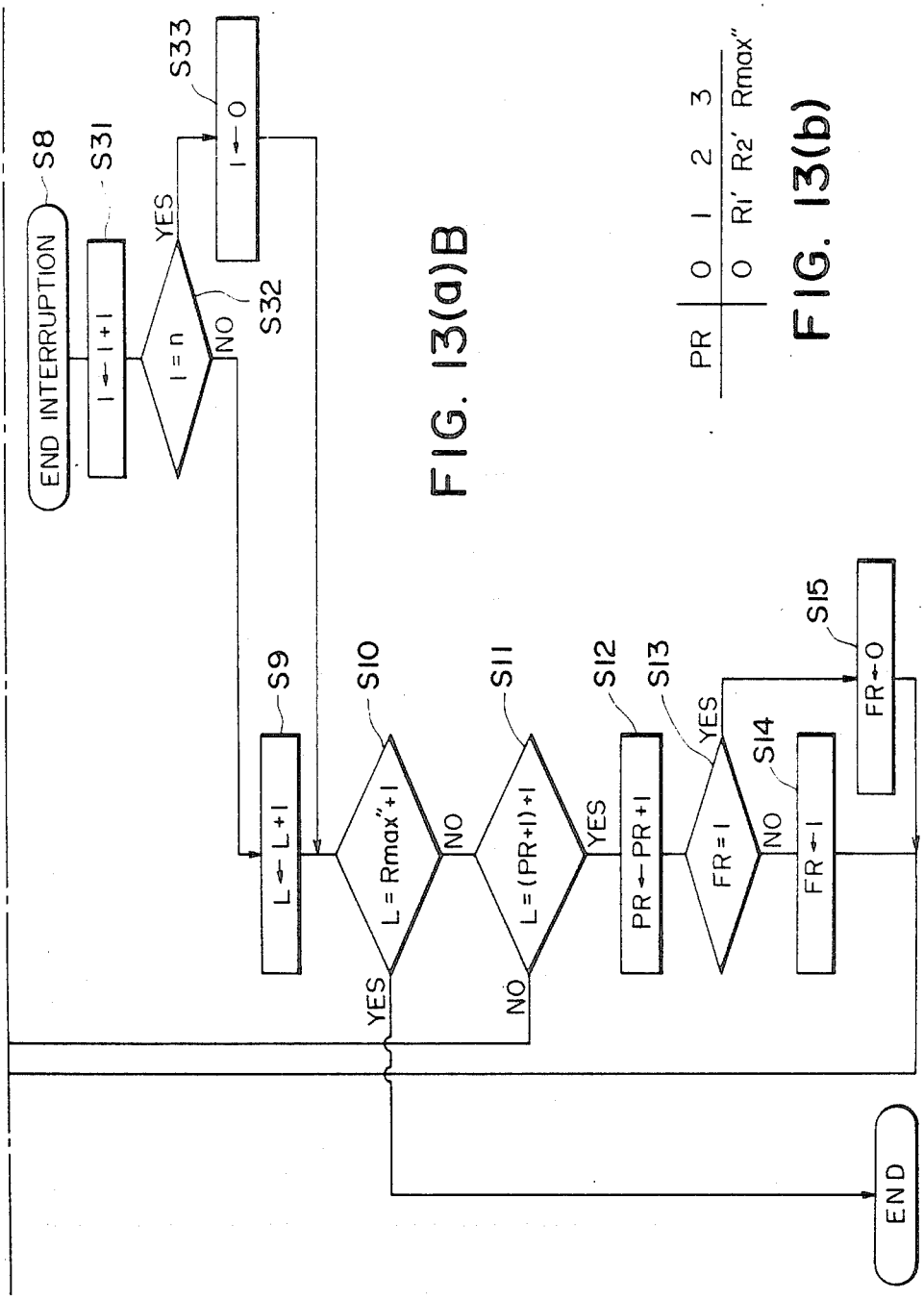

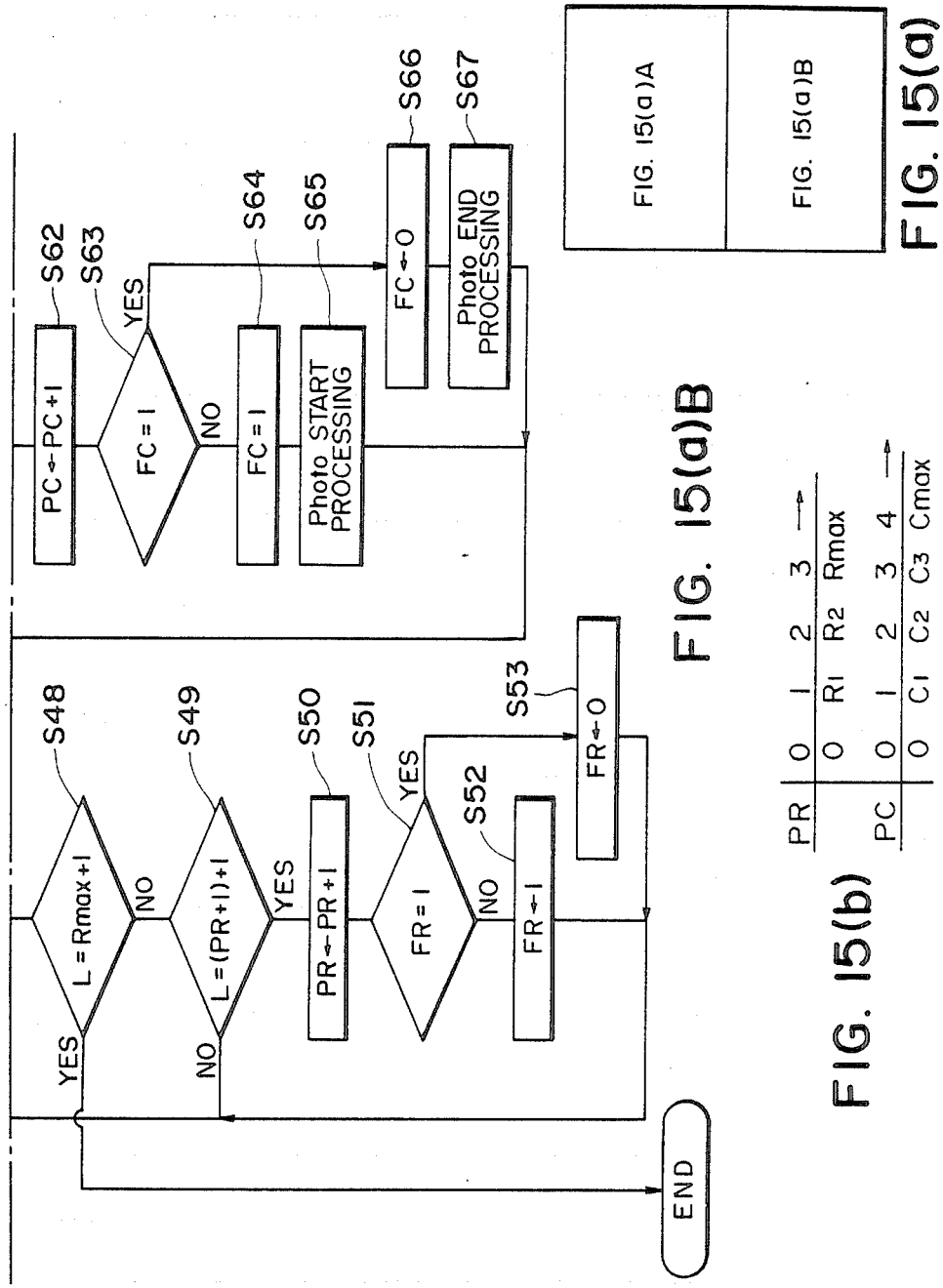

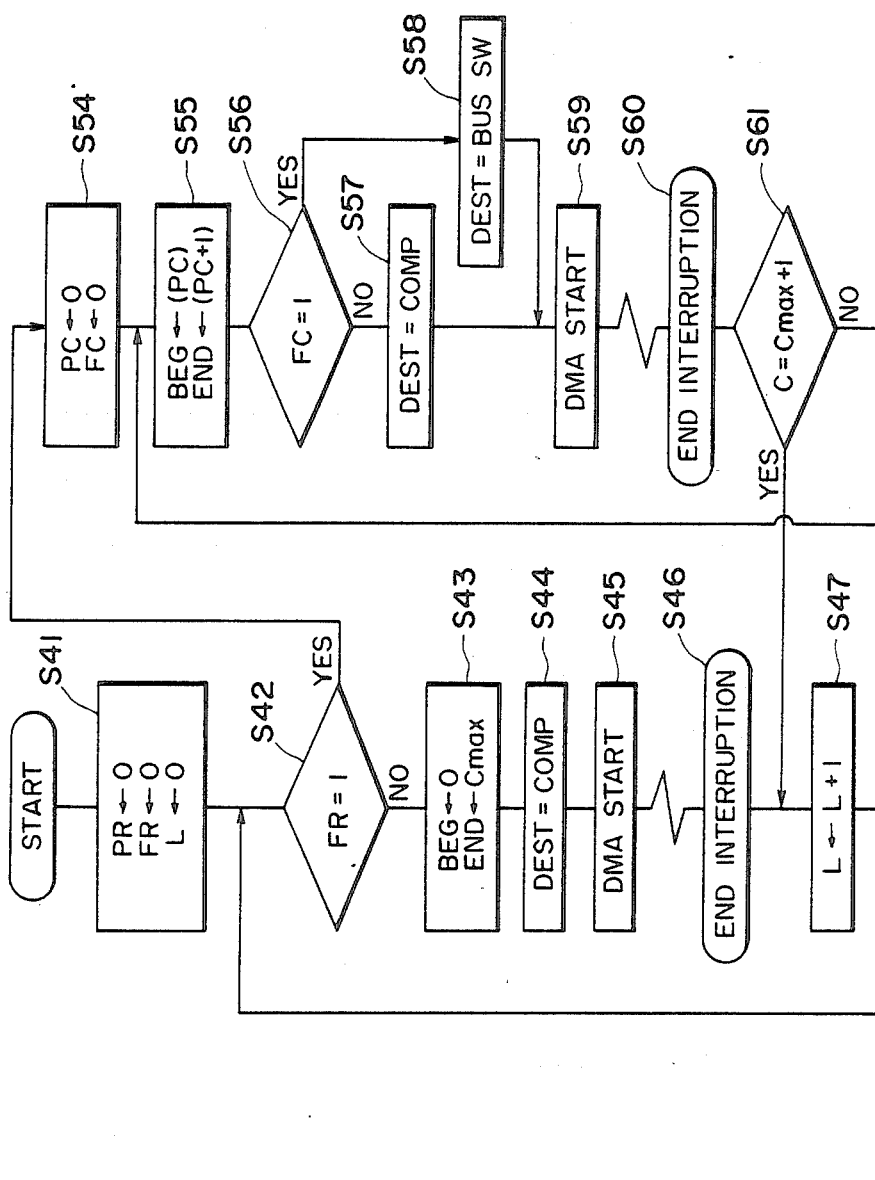
FIG. 15(a)A

IMAGE INFORMATION PROCESSING SYSTEM

BACKGROUND OF THE INVENTION

1. Field of the Invention

This invention relates to an image information processing system, and more particularly to an image information processing system which electrically deals with image information and can accomplish recording and storage of images or transmission or the like of image information between it and other apparatus.

2. Description of the Prior Art

In recent years, in the field of the office automation, the demand has become strong for an image information processing system which electrically deals with image information such as pictures, figures and photographs in the same manner as that in which documents are dealt with and which can store electrical image information or can accomplish the exchange of image information between it and other apparatus through a communication network or the like, and the market has seen the advent of apparatuses of such type.

In an apparatus of such type, an original is set on an input device such as an image scanner for inputting image information, the input device reads the image information from the original, and the read image information is suitably compressed and stored in a memory such as an optical file or transmitted to other apparatus.

The apparatus for reproducing this data or the apparatus having received the transmitted data has expanded the sent image information on a recording sheet set on an output device such as a laser beam printer, as required, and then has printed and put out the image.

Generally, an image data comprising a mixture of characters, figures, photographs, etc. is enormous in amount as compared with an image data comprising characters only. Accordingly, if it is digitally stored, the memory capacity becomes great and also, when the data is to be transmitted to an external apparatus at a limited transmission speed, a long time will be required to transmit even an image data corresponding to one page. So, the image data thinning/insertion method is often used for this purpose.

Heretofore, as seen in a facsimile apparatus or the like, the thinning/insertion control in the main scanning and sub scanning has been effected. For example, characters and figures are read while being thinned for each predetermined line in the sub scanning direction and are false-reproduced on the reception side. However, where half-tone images such as photograph images have been read while being thinned, the images false-reproduced on the reception side are sometimes not good half-tone images, and this method has not been very preferable for half-tone images. Also, this thinning function can be alternatively selected for an image (an original) and can no longer be displayed where an image comprises a mixture of characters, figures, photographs, etc.

Also, the image data encoding compression/expansion method is often used as a method of decreasing the amount of image data to be transmitted or stored without executing the above-described image data thinning process. The run length method or the modified Hoffmann (MH) method is often used as a method which is simple in construction and can obtain a good compression/expansion ratio, but these methods are suitable for the compression of character and figure data in which white or black binary data continues and are not suitable for data such as photographs having half-tones.

Therefore, various types of apparatus have heretofore been constructed by usage and, for example, the type of apparatus exclusively for use for figures or the type of apparatus exclusively for use for photographs has been prepared. Accordingly, if photographs are transmitted by the type of apparatus exclusively for use for characters and figures which is simple in construction and can obtain a relatively high compression/expansion ratio, the intended performance cannot be displayed, and if characters and figures are transmitted by the type of apparatus exclusively for use for photographs which is expensive, the intended performance cannot be displayed and in addition, it is uneconomical. Much less, where the image to be transmitted comprises a mixture of characters and photographs, it is actually difficult to imagine what degree of compression/expansion ratio can be obtained, and if encoding compression is applied to photograph data rather by the run length method, there has been a disadvantage that the data becomes rather great.

Also, in a case where an image data is to be transmitted to other output device placed at a remote place and the image is to be recorded on a recording sheet by that output device or in a case where an image data already stored in an image file is to be read out and the image is to be reproduced, if the size of the recording sheet set on the output device is not coincident with the size of the input original, it is possible in the case of a document original to enlarge or reduce the image information and thereby adjust the size thereof to the size of the recording sheet, but in the case of a figure or a photograph which requires a high resolution, the original image cannot be made to correspond to the recorded image by the enlarging/reducing process and the recorded image becomes very difficult to see. Therefore, where the size of the input original is not coincident with the size of the recording sheet, the image information cannot be put out by the output device and thus, the transmission of the image information has become wasteful.

Particularly, where image information communications are to be effected between Japan and a foreign country, for example, the United States of America, the standard paper sizes differ between the two countries and it is wasteful to prepare all these paper sizes.

SUMMARY OF THE INVENTION

The present invention has been made in view of the above-mentioned points and an object thereof is to provide an image information processing system which can execute processes such as storage, transmission and recording of image data efficiently and without reducing the quality of the image.

Another object of the present invention is to provide an image information processing system which can well and efficiently process various images different in nature such as characters, figures and photographs.

Still another object of the present invention is to provide an image information processing system which is capable of accomplishing image processing suited to transmit to a remote place an image data obtained by photoelectrically reading the image of an original.

Yet still another object of the present invention is to provide an image information processing system which can effect different image information processings by dividing an image area, thereby efficiently processing and putting out image information comprising a mixture of characters, figures, photographs, etc.

A further object of the present invention is to provide an image information processing system which divides an image area and can read or false-reproduce the image at a density corresponding to the nature thereof, thereby efficiently processing and false-reproducing the image information comprising a mixture of characters, figures, photographs, etc. by a simple construction.

The above and other objects of the present invention and the excellent operational effect of the present invention will become apparent from the following detailed description.

BRIEF DESCRIPTION OF THE DRAWINGS

FIG. 12(a), including FIGS. 12(a)A and 12(a)B is a flow chart showing the control procedure of the present embodiment executed by an MPU 1 with respect to data thinning read (characters, figures, etc.) and non-thinning read (photographs, etc.).

FIG. 12(b) shows the structure of an area map table $2_1$ provided in a memory 2.

FIG. 13(a), including FIGS. 13(a)A and 13(a)B is a flow chart showing the control procedure of the present embodiment executed by the MPU 1 with respect to data insertion print (characters, figures, etc.) and non-insertion print (photographs, etc.).

FIG. 13(b) shows the structure of the area map table $2_1$ provided in the memory 2.

FIG. 15(a), including FIGS. 15(a)A and 15(a)B is a flow chart showing the control procedure of the present embodiment executed by the MPU 1 with respect to data compression and non-compression.

FIG. 15(b) shows the structure of the memory map table $2_1$ provided in the memory 2.

DESCRIPTION OF THE PREFERRED EMBODIMENT

An image processing system according to an embodiment of the present invention will hereinafter be described in detail with reference to the drawings.

Figure 1:
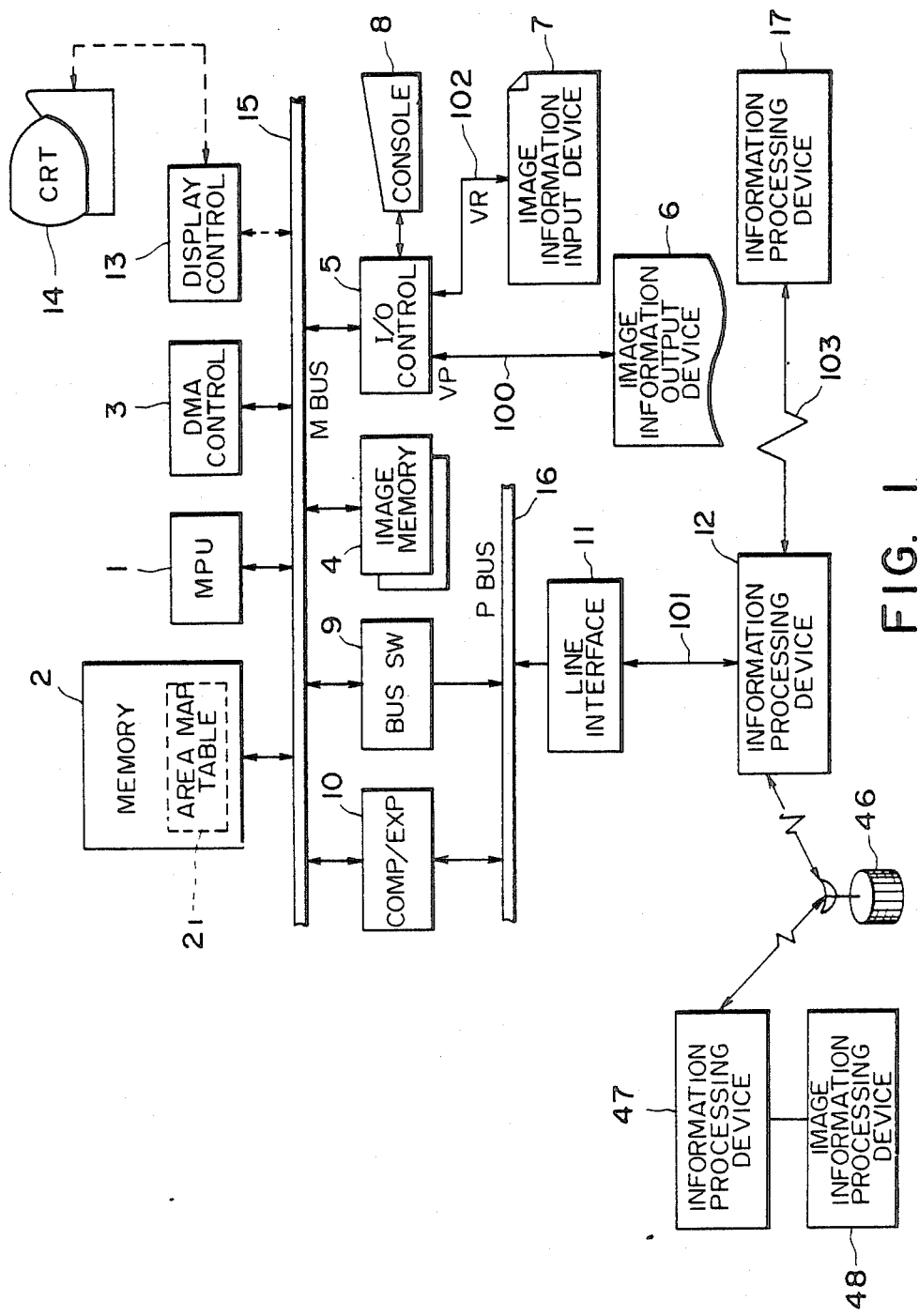
FIG. 1 is a block diagram of an image information processing system provided with an image processing apparatus according to an embodiment of the present invention.

FIG. 1 is a block diagram of the image processing system according to an embodiment of the present invention. In FIG. 1, reference numeral 1 designates a control unit (MPU) comprising chiefly, for example, a microcomputer and governing the whole control of the apparatus of the present embodiment, reference numeral 2 denotes a memory for storing the operation control program and control information of the MPU 1, reference numeral 3 designates a DMA control device (DMA) which effects the direct memory access control chiefly between an image memory 4 and other block construction, reference numeral 4 denotes an image memory comprising, for example, a semiconductor memory storing binary image information corresponding to at least one page, and reference numeral 5 designates an input/output control unit for controlling an image information output device (printer) 6 and an image information input device (reader) 7. For example, this input/output control unit 5 may be directly connected to the printer 6 to form an original copying system, and the inputting of parameters necessary for such mode designation and control is effected from a console 8 by the operator. Reference numeral 9 designates a signal bus switch for combining a P (peripheral) bus 16 and an M (main) bus 15 together, reference numeral 10 denotes a compression/expansion unit which effects the encoding compression/decoding expansion of a binary image data, and reference numeral 11 designates a line interface unit which connects the present apparatus to an externally connected information processing device (host computer) 12 through a line 101. Further, the host computer 12 is connected to another information processing device 17 through a communication circuit 103, whereby processed image data can be transmitted to and received by any instrument. As option, a display control device and a CRT display device 14 can be connected.

The information processing device 12 is also connected to a communication network and can be connected not only to an information processing device installed in the country, but also to other information processing device 47 installed abroad, through a communication satellite 46, and an image information input/output device 48 similar to the present embodiment is connected to the information processing device 47. The communication control in this communication network is effected by the information processing devices 12 and 47, and a data communication system of GP-IB standard is used between the information processing devices and the line interface unit 11.

Figure 2:
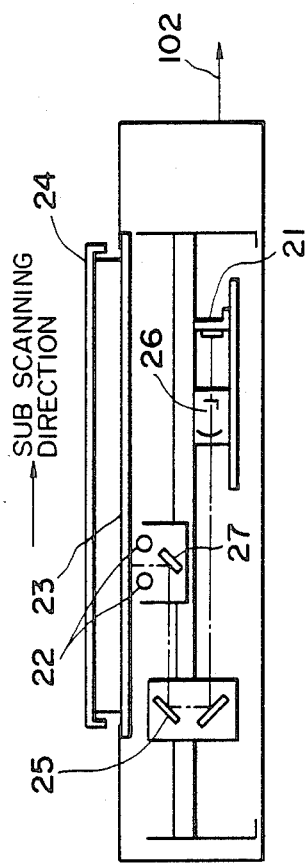
FIG. 2 shows the construction of a reader 7.

FIG. 2 shows the construction of the reader 7. An original is placed on an original supporting glass plate 23 with the image thereof to be read facing downward. The placement reference thereof lies at the left innermost side as viewed from the front. The original is held down against the original supporting glass plate 23 by an original cover 24. The original is illuminated by a fluorescent lamp 22, and an optical path is formed so that the reflected light from the original is condensed on the surface of a CCD 21 (image sensor) having a plurality of light-receiving elements arranged in a row, via mirrors 25, 27 and a lens 26. The mirrors 27 and 25 are adapted to be moved at a relative velocity of 2:1. This optical unit is moved from left to right at a predetermined velocity with PLL being applied thereto by a DC servo-motor, and effects sub scanning. The resolution in this sub scanning direction is 16 lines/mm.

As regards the main scanning direction, the readable main scanning width of the CCD 21 is the shorter width 257 mm of maximum B4. To make this into 16 pel/mm, 4112 (=257×16) bits are required as the number of bits of the CCD and therefore, in the present apparatus, a CCD array sensor having about 5000 bits of light-receiving elements is used to effect the reading operation.

In the manner described above, the image of the original placed on the original supporting glass plate 23 is read one line after another and provides a 6-bit digital image signal indicative of the light and shade of each picture element. This digital image signal is formed into an image reading signal VR by a binary circuit using the Diza method or the like, and is put out onto a line 102.

Figure 3:
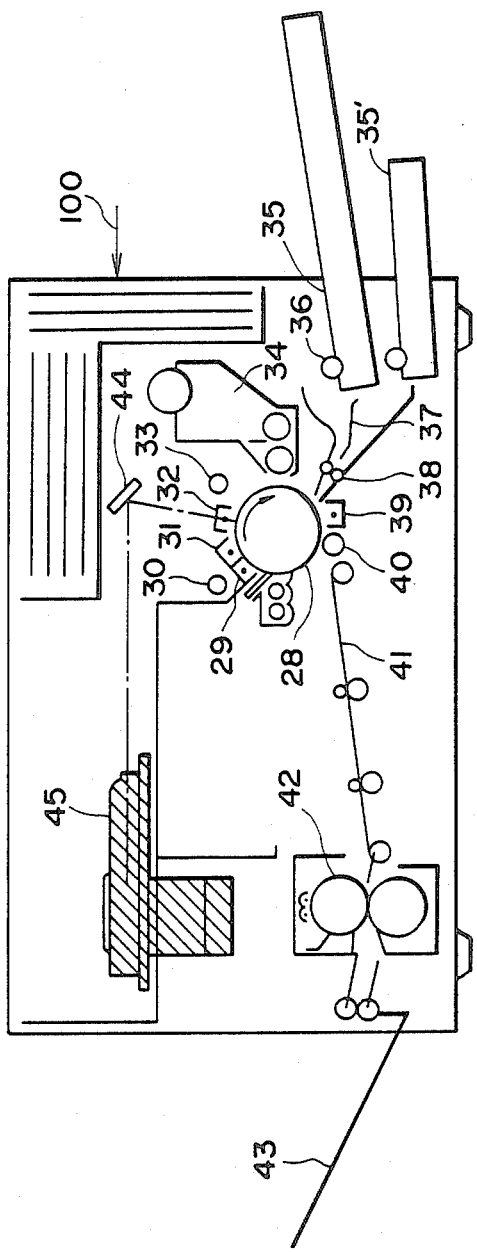
FIG. 3 shows the construction of a printer 6.

FIG. 3 shows the construction of the printer 6. An image signal VP bit-serially sent through a line 100 is input to the laser scanning optical system unit 45 of the printer. This unit 45 comprises a semiconductor laser, a collimator lens, a rotational polygon mirror, an F$\theta$ lens and a fall correcting optical system. For example, where the printer 6 is directly connected to the reader 7, the image reading signal VR (=VP) from the reader 7 is applied to the semiconductor laser and electro-optically converted, and the laser light emitted therefrom is collimated by the collimator lens and applied to the polygon mirror being rotated at a high speed, whereby the laser light is scanned on a photosensitive medium 28. Thus, a latent image is formed on the photosensitive medium 28.

This photosensitive medium 28 comprises three layers, for example, an electrically conductive layer, a photosensitive layer and an insulating layer. Accordingly, process components for enabling an image to be formed on the photosensitive medium 28 are disposed. Reference numeral 29 designates a pre-discharger for removing any unnecessary charge on the photosensitive medium 28, reference numeral 30 denotes a pre-discharging lamp, reference numeral 31 designates a primary charger for uniformly charging the photosensitive medium 28, reference numeral 32 denotes a secondary charger, reference numeral 33 designates a whole surface exposure lamp, reference numeral 34 denotes a developing device for developing the latent image, reference numerals 35 and 35' designate paper supply cassettes containing transfer sheets of different sizes therein, reference numerals 36 and 36' denote paper supply rollers for supplying transfer sheets from the cassettes 35 and 35', reference numeral 37 designates a paper supply guide, reference numeral 38 denotes register rollers for feeing the transfer sheet in timed relationship with the image on the photosensitive medium 28, reference numeral 39 designates a transfer charger for transferring the image on the photosensitive medium to the transfer sheet, reference numeral 40 denotes a separating roller for separating the transfer sheet from the photosensitive medium 28, reference numeral 41 designates a conveyance guide, reference numeral 42 denotes a fixing device, and reference numeral 43 designates a tray. Thus, the image formation based on the received image reading signal VR (=VP) is effected on the transfer sheet. Of course, the input/output control unit 5 can be connected to the reader 7 and the image memory 4 or to the image memory 4 and the printer 6, through the M bus 15.

Figure 4:
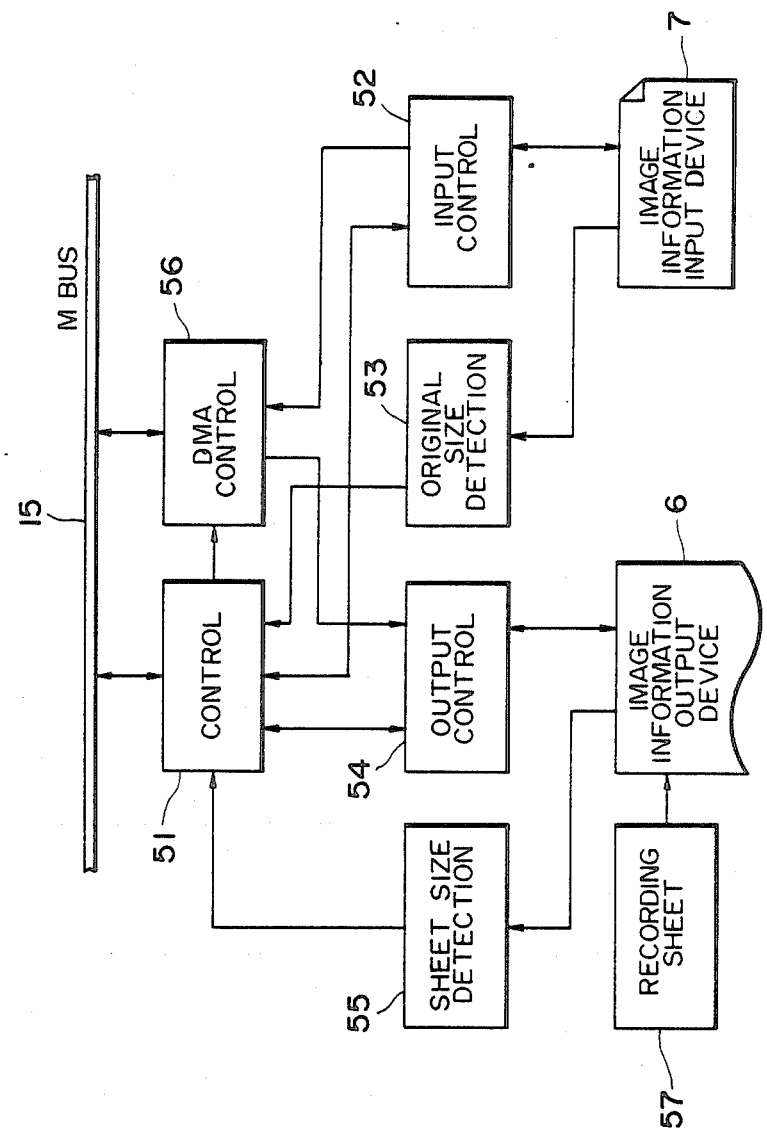
FIG. 4 is a detailed block diagram of the input/output control unit of the present embodiment.

A detailed block diagram of the input/output control unit 5 is shown in FIG. 4.

In FIG. 4, reference numeral 51 designates a control unit which governs the control of the entire input/output control unit 5, reference numeral 52 denotes an input device control unit which governs the interface control with the image information input device 7, reference numeral 53 designates an original size detecting unit for detecting the size of an original set on the original reading surface of the image information input device 7, reference numeral 54 denotes an output device control unit which governs the interface control with the image information output device 6, and reference numeral 55 designates a sheet size detecting unit for detecting the size of a recording sheet 57 set on the image information output device 6. Reference numeral 56 denotes a DMA control unit for effecting the give and take of image information between the image memory 4 and the output device or the input device by the direct memory access system with the aid of the DMA control device 3.

Figure 5B:
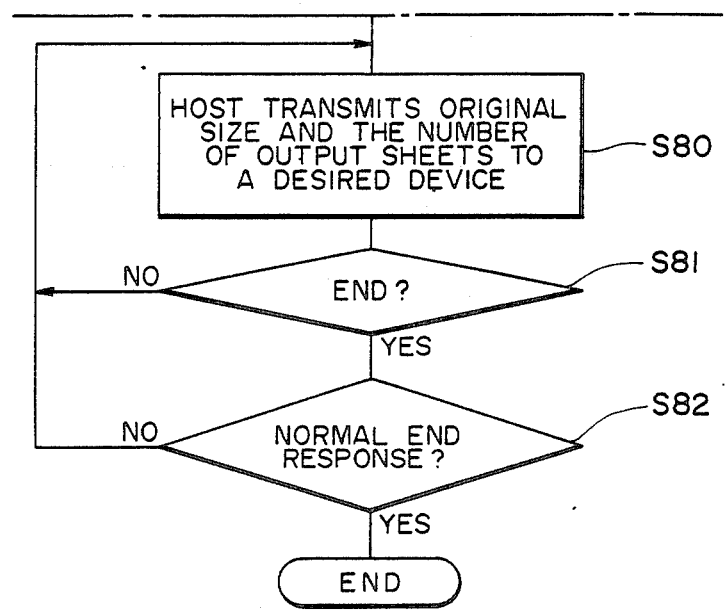
FIGS. 5A and 5B is a flow chart of the image information input and transmission control by the on-line of the present embodiment.
Figure 5:
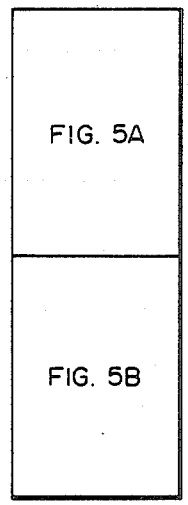
FIG. 5 including
Figure 5A:
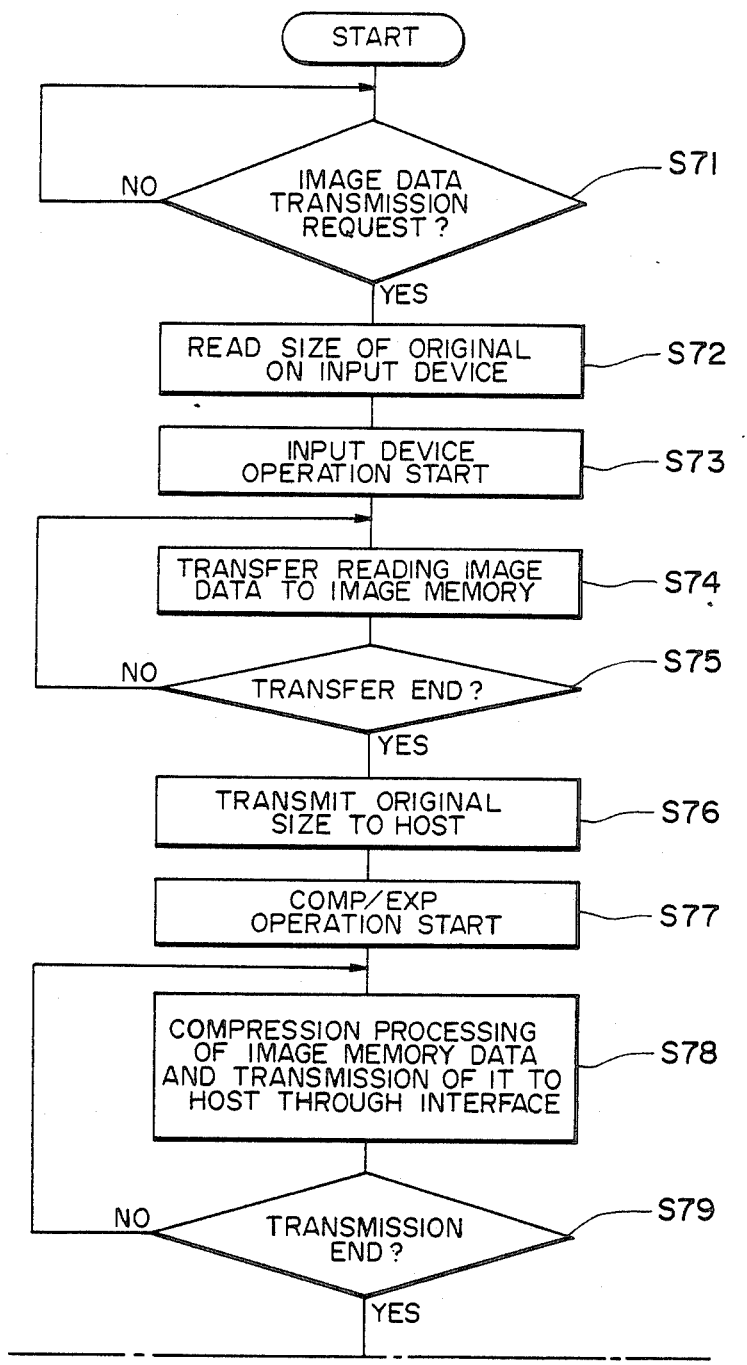

The input/output control and transmission/reception control of the image information in the present embodiment will hereinafter be described in detail by reference to the flow charts of FIGS. 5 and 6(A) and (B).

The original reading control and the transmission control of the read image information in the present embodiment will first be described by reference to FIG. 5.

When image information is to be read from an original and transmitted to other apparatus installed at a remote place, the operator first sets the original on the original reading surface of the image information input device 7, designates a desired image information transmission addressee device (e.g., the information processing device 21 of FIG. 1) by a keyboard unit 8 or by the information processing device, and requests the transmission of the image information. When this request is made, the program proceeds from step S71 to S72, whereby the control unit 51 starts the original size detecting unit and reads the size of the original set on the image information input device 7. In accordance with this read size of the original, the MPU 1 allots the storage area of the image memory 4. At step S73, the image information input device 7 is started and the reading of the image information from the original is initiated, and the image information read at step S74 is stored into the image memory 4. In this case, the thinning process in accordance with the area designation may be executed as previously described. At step S75, whether the reading of the image information and the storage thereof into the image memory 4 have all been terminated is monitored and, upon termination of said reading and said storage, the program proceeds to step S76, whereby the original size information detected by the original size detecting unit 53 is transmitted to the host information processing device 12 through the bus switch 9 and the line interface unit 11. Subsequently, at step S77, the compression/expansion unit 10 is started and, at step S78, the image information previously read and stored in the image memory 4 is read out and is suitably compressed by the compression/expansion unit 10, and this compressed image information is transferred to the host information processing device 12 through the line interface unit 11. At this time, a compression/non-compression operation may be effected in accordance with the area designation, as previously described. At step S79, whether this transfer has all been terminated is examined and, if the transfer is not terminated, the transfer is continued, and when the transfer is terminated, the program proceeds to step S80.

The image information which need not be expansion-processed is intactly transferred to the line interface unit 11 by the bus switch 9 without the intermediary of the compression/expansion unit 10.

At step S80, the information processing device 12 which has received the image information transmits the original size previously received at step S76 and the designated information of the pre-designated number of output sheets to the transmission addressee information processing device, and subsequently transmits the image information thereto. At step S81, whether the transmission of all the image information has been terminated is examined and, if it is terminated, the response from the transmission addressee device is waited for at step S82, and if this response is a normal end response, the processing is terminated, and if said response is not a normal end response, the program returns to S80, whereby the re-transfer of the image information is executed.

By the above-described processing, the image information can be read from the image information input device 7 and subjected to the compression processing and transferred to other desired information processing device.

Figure 6A:
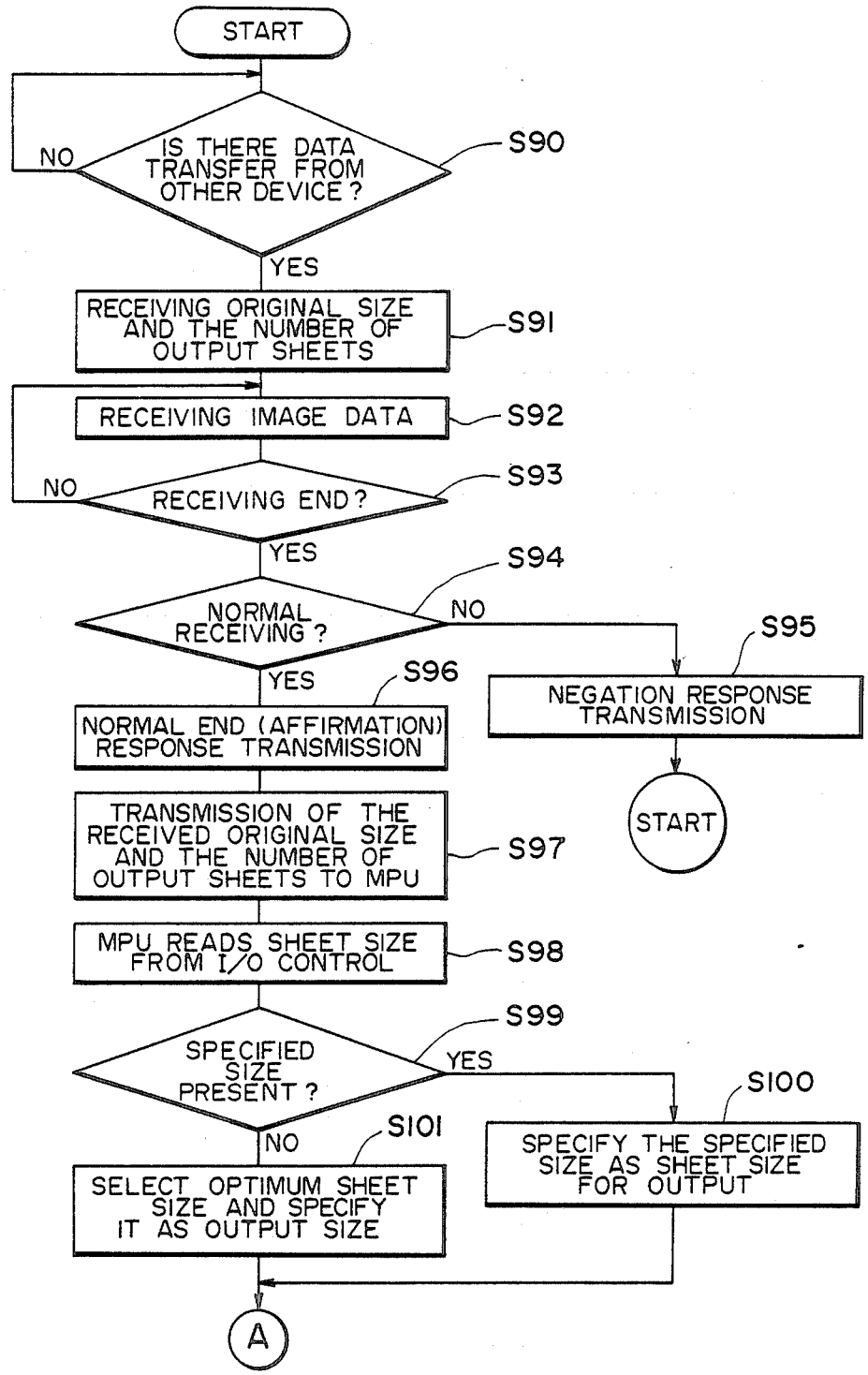
FIGS. 6(A) and (B) are flow charts of the reception and image information output control by the on-line of the present embodiment.
Figure 6B:
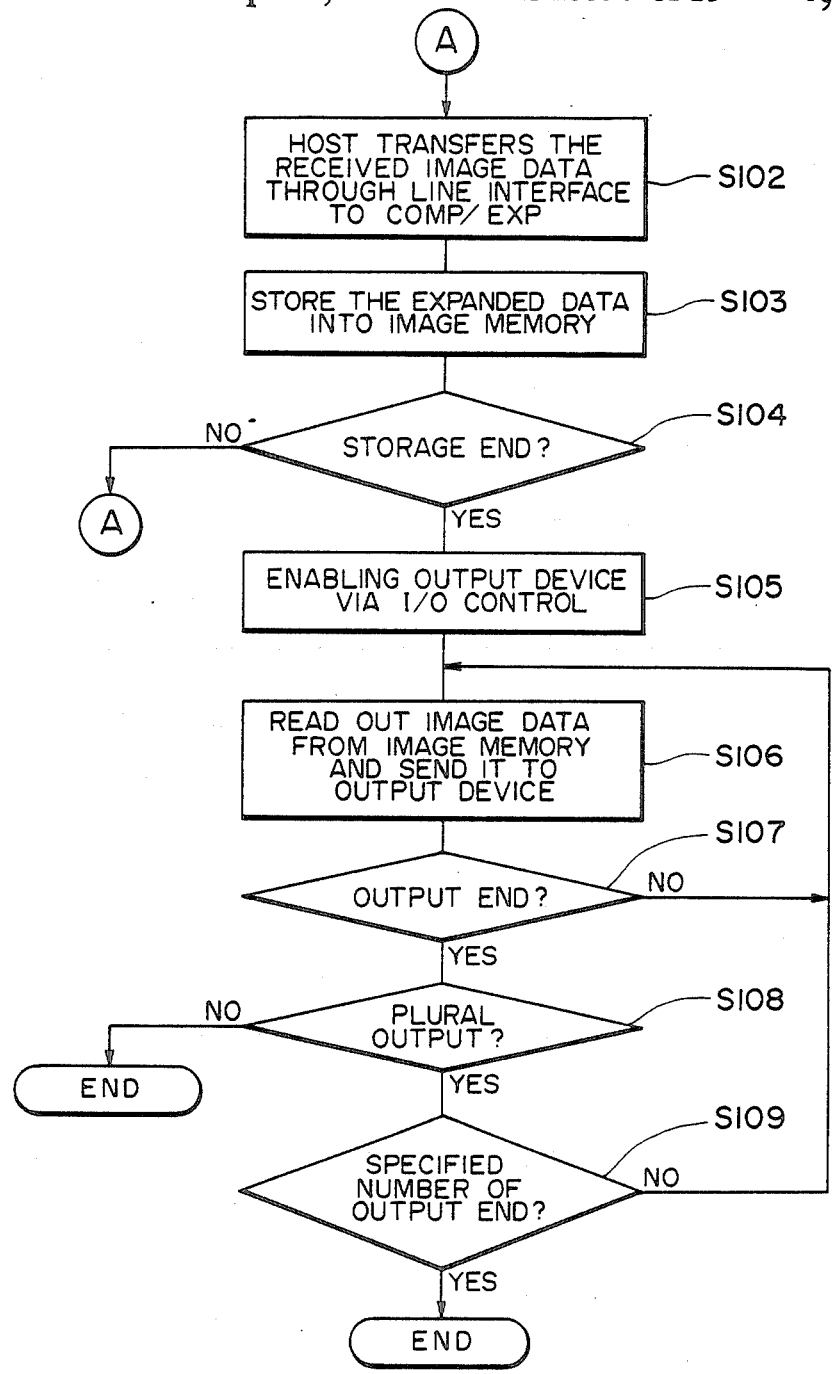

Reference is now had to FIGS. 6(A) and (B) to describe the process of receiving the image information transferred in the above-described manner and putting out it from the image information output device 6.

First, at step S90, the information processing device 12 monitors whether there is the transfer of image information from other device (for example, the information processing device 21 of FIG. 1) and, if there is the transfer, the program proceeds to step S91, and the original size, i.e., the size of the recording sheets put out from the image information output device 6 and the information of the number of output sheets are sent. At the subsequent steps S92 and S93, the image information sent is received and when the reception is all terminated, the program proceeds from step S93 to step S94, at which whether there has occurred a great error of reception during the receiving process and re-sending of data is necessary is examined and, if the re-sending is necessary, a negative response is transmitted to the image information transmitter device at step S95 and the program returns to step S90, and re-sending of data is waited for.

When the re-sending is not necessary, a normal end response is transmitted at step S96, and at the next step S97, the information processing device 12 sends the received original size and the number of output sheets to the MPU 1 through the line interface unit 11 and the bus switch 9, and the MPU 1 stores them in the memory 2. At step S98, the MPU 1 starts the input/output control unit 5 and reads the size of the recording sheets set in the image information output device 6, through the sheet size detecting unit 55 and the control unit 51. At the next step S99, whether there is a recording sheet of a size coincident with the original size is examined, and if there is a recording sheet of such size, an instruction is given at step S100 to the input/output control unit 5 to record on the recording sheet of that size, and then the program proceeds to step S102.

When there is no size coincident with the original size at step S99, the program proceeds to step S101, at which an optimum sheet size is selected from among the recording sheet sizes set in the image information output device 6, and an instruction is given to the input/output control unit 5 to record on the recording sheet of the selected size, and the program proceeds to step S102.

As regards the selection of the optimum sheet size, where there is no great difference between, for example, A4 size used in Japan and the letter size used in the United States and other countries and the difference in recording capacity between these two sizes is a predetermined amount or less, that size is selected as the optimum size. Also, where the original is of A4 size and the recording sheet is of B4 or B5 size and the difference between these sizes is great, a recording sheet of a size most approximate to and larger than the original size is selected. When a recording sheet of a size larger than the original size is not set, a recording sheet of a size most approximate to the original size is selected.

At step S102, the host information processing device 12 transfers the received image information to the compression/expansion unit 10 through the line interface unit 11. In the compression/expansion unit 10, the image information sent thereto is expanded and at step S103, the expanded image information is stored in the image memory 4. At the next step S104, whether the storage of the received image information into the image memory 4 has been terminated is examined and, if the storage is not yet terminated, the program returns to step S102 and the storage of the image information into the image memory 4 is continued. If the storage has been terminated, the program proceeds to step S105.

Control may be effected so that the processing of steps S98–S101 and the processing of steps S102–S104 may be executed simultaneously with each other.

Also, when uncompressed image information has been received, this image information is transferred to the image memory through the bus switch 9 without the intermediary of the compression/expansion unit 10.

At step S105, the image information to be put out from the image information output device 6 is complete at the image memory 4 and therefore, the image information output device 6 is started through the input/output control unit 5. Then, at steps S106 and S107, the image information to be put out from the image memory 4 is read out by the direct memory access system and put out to a recording sheet of the selected size.

When the recording of the image information corresponding to one page is terminated, the program proceeds from step S107 to step S108, at which whether the designation of the number of output sheets has been the designation of a plurality of outputs is examined and, if it is not the designation of a plurality of outputs, the processing is terminated, and if it is the designation of a plurality of outputs, whether the designated number of outputs have been terminated is examined at step S109, and if the designated number of outputs have not yet been terminated, the program proceeds to step S106 and the same image information as that previously stored in the image memory 4 is again put out to a new recording sheet. If the designated number of outputs have been terminated, the processing is terminated.

As described above, there can be provided an image information processing system in which even when recording mediums of a desired size are not set in the image information output device, the image information can be transferred and this image information can be put out to a recording medium of the optimum size among the set recording mediums and in which it becomes unnecessary to prepare recording mediums of all necessary sizes for the image information output device and the deterioration of the quality of the output image is not caused by effecting the unnecessary compressing process or expanding process on the image information.

In the present image processing system, as described above, image data obtained by reading the image of an original are transmitted to remote places or recording of images is carried out on the basis of image data transmitted from a remote place. In such a case, it is desired to decrease the amount of image data transmitted and thereby enhance the transmission efficiency. This decreasing of the amount of image data will hereinafter be described.

Figures 7A, 7B:
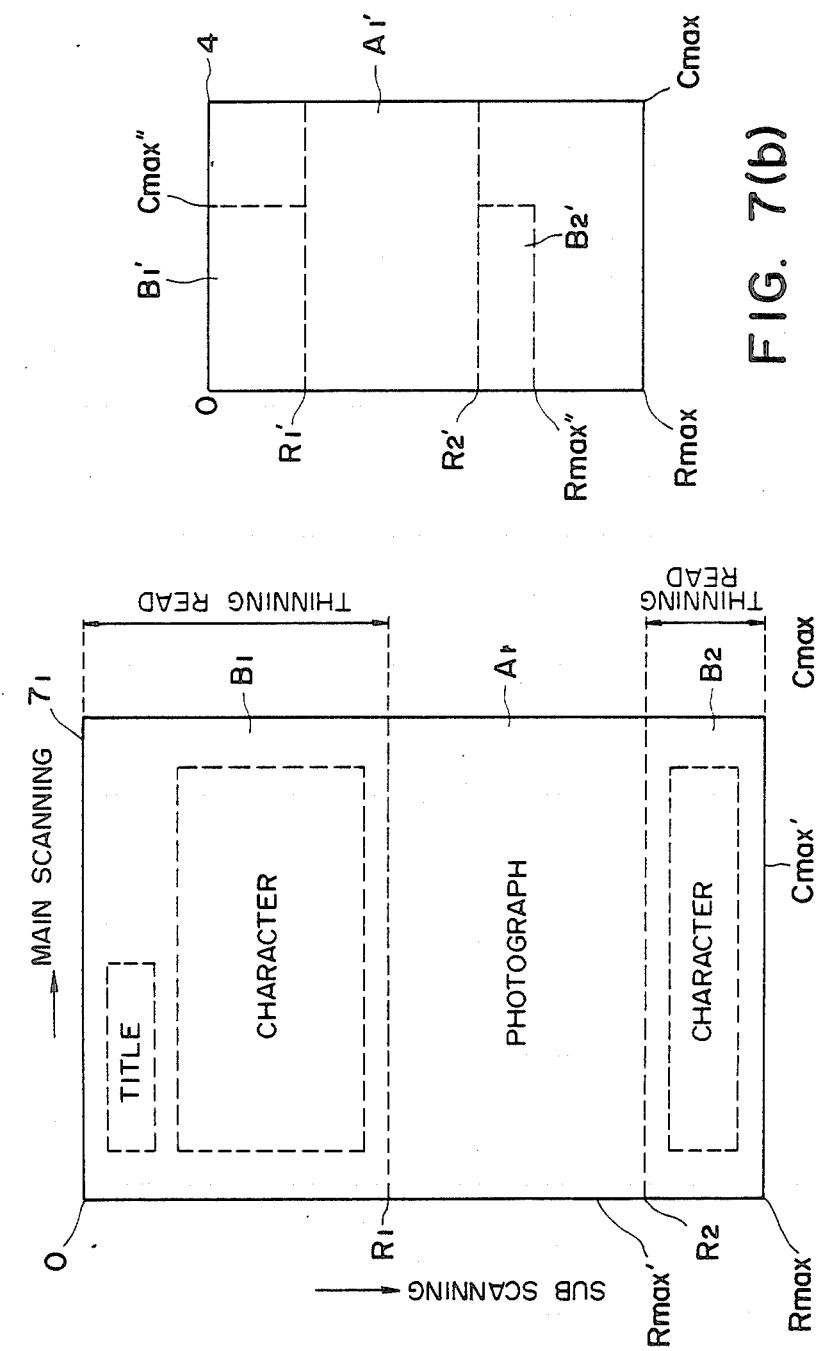
FIGS. 7(a) and 7(b) illustrate the operation and the principle of operation of the apparatus according to the present embodiment.

FIGS. 7(a) and (b) illustrate the operation and the principle of operation of the apparatus according to the present embodiment. FIG. 7(a) shows the area map of an example of the original $7_1$, and this area map is made to intactly correspond to the image storing area of the image memory 4 which corresponds to one page. Also, FIG. 7(a) is shown correspondingly to the main scanning and sub scanning directions of the reader 7. Actually, many of documents often are fixed formats in which characters, figures, photographs, etc. are arranged at predetermined positions, but the nature of the images included therein differs between characters, graphs and photographs. Of these, characters and graphs will hardly lose their information even if their patterns are thinned. In contrast, photographs include half tones and minute image areas and therefore, if they are thinned, the quality of image will be remarkably marred. So, the concept of area map has been introduced and an image has been handled while being divided in conformity with their natures. For example, an image is divided in such a manner that $B_1$ is an area comprising a title, characters and a figure, $A_1$ is an area comprising a photograph and $B_2$ is an area comprising characters and a figure. When an original matching such a fixed format is to be read from the reader 7, the images of the areas $B_1$ and $B_2$ are read by thinning 16 pel/mm to 4 pel/mm, for example, and the image of the area $A_1$ is intactly read without being thinned, whereby a relatively high image data compression effect is obtained by a simple construction without the quality of image being marred. This also holds true of the image data expansion effect.

Such area designation can be accomplished by the use of the digitizer of the console 8 or a corrdinates input mechanism such as a numeric key. That is, if A ($R_1$, $R_2$, ...) is console-input as the area designation input, the MPU 1 receives it through the M bus 15. Here, A means the area designation input in the direction of column, $R_1$ in the parentheses indicates the number of lines corresponding to the boundary of the first area, $R_2$ in the parentheses indicates the number of lines corresponding to the boundary of the next area, and ... indicates that inputting may be further continued. The MPU 1 forms the area map table $2_1$ of the memory 2 in accordance with the area designation data input. Also, if nothing is designated, it means the area B to be thinning-read and is suitable for an original having only characters and a figure. Of course, Various formats of originals can be coped with, because a photograph area may be estimated and console-input before the original is read. If will be readily appreciated that there is a sufficient effect even if the estimate is not accurate. Also, it is a matter of course that the area may be accurately determined by the use of a predetermined scale or the like. The original in this case may be of a size smaller than the image memory 4. In this case, by knowing, for example, the size of the original sheets, the maximum values Rmax and Cmax of the area map are changed to Rmax' and Cmax' respectively, corresponding to the original size.

FIG. 7(b) shows a case where the image data obtained by selectively thinning-reading an original is stored in the image memory 4. It can be seen in FIG. 7(b) that since the images of the areas $B_1$ and $B_2$ are thinning-processed in the main scanning and sub scanning directions, respectively, the amounts of data are decreased and stored in the areas $B_1''$ and $B_2''$, respectively. This shows that if an image comprises only characters and a figure, an original of a size larger than the size of the image memory 4 can be read and stored in the same memory. The image of the area $A_1$ is stored in an area $A_1'$ of the same size. With regard to insertion and expansion, the case is converse to this. Operation will become easier if the CRT display device 14 provided as option is caused to depict an area map and the area setting is executed while the area map is visually watched.

Figure 8:
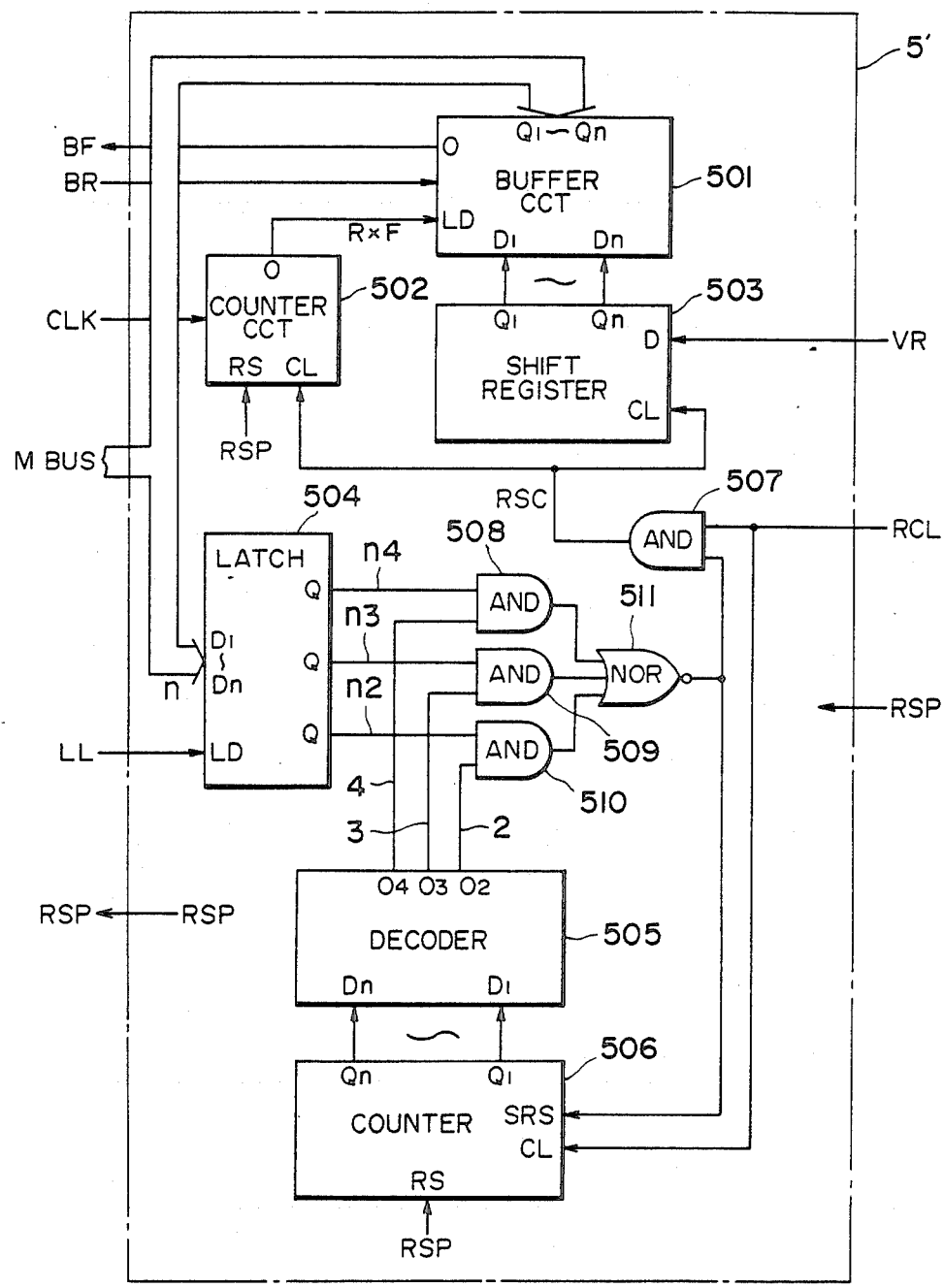
FIG. 8 is a block diagram showing the interface unit 5' of the reader 7 in an input/output control unit 5.
Figure 9:
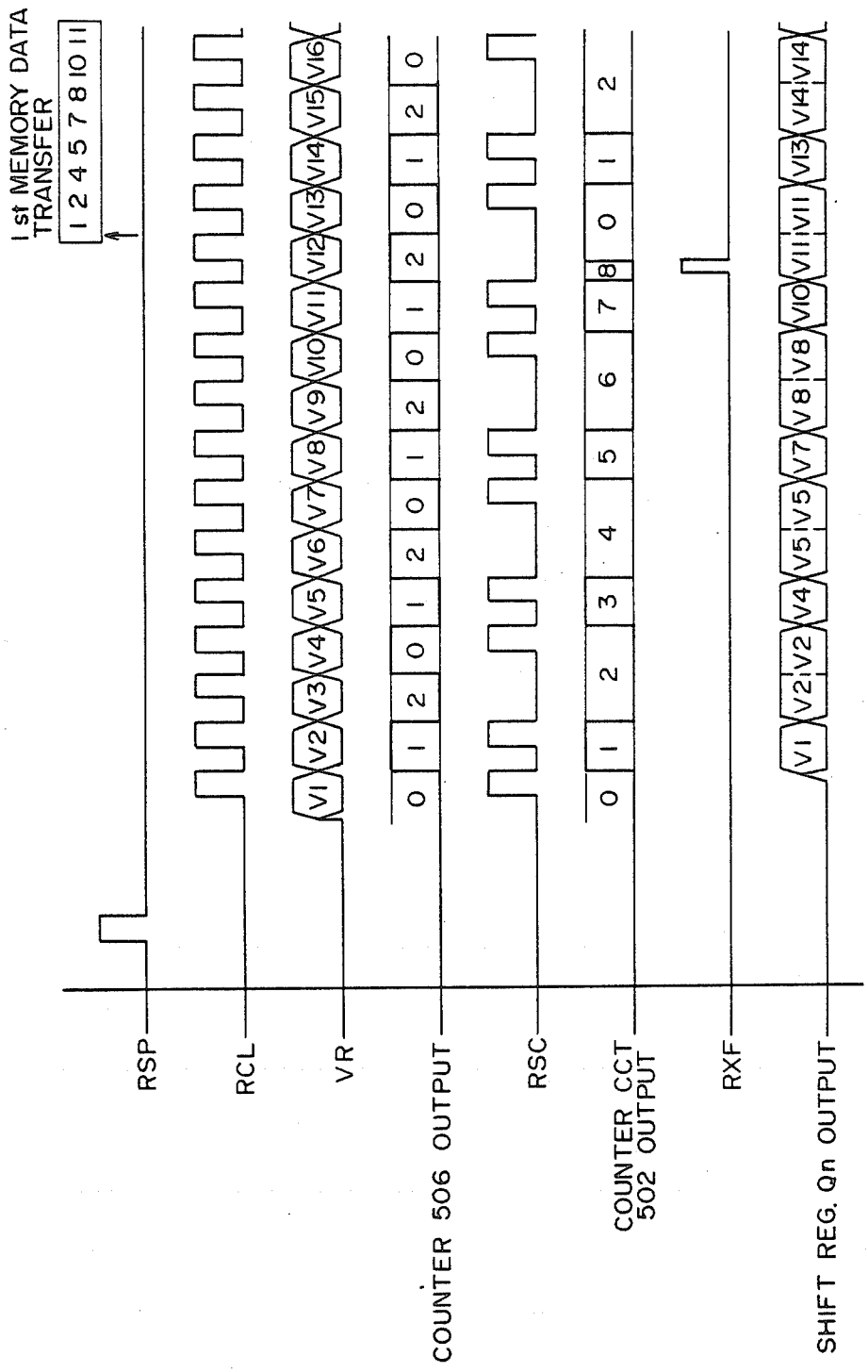
FIG. 9 is a timing chart showing the operation of FIG. 8.

FIG. 8 is a block diagram showing the interface unit 5' of the reader 7 provided in the input/output control unit 5, and FIG. 9 is a timing chart showing the operation of FIG. 8. The thinning read operation of the present invention will hereinafter be described by reference to FIGS. 8 and 9.

From the reader 7, a read synchronous signal RSP for each line is sent and subsequently to this signal, a clock signal RCL corresponding to a series of read picture elements is sent. A counter 506 is reset by the signal RSP and counts up by the signal RCL. On the other hand, a thinning designation constant n is sent in advance from the MPU 1 to a latch 504 through the M bus, and for example, a designated level Q such as a cycle of thinning ($\frac{1}{3}$) per every two dots of main scanning or a cycle of thinning ($\frac{1}{4}$) per every three dots of main scanning is maintained. The output of the counter 506 is input to a decoder 505, the output of which renders output terminals $O_2$, $O_3$ and $O_4$ corresponding to count values 2, 3 and 4, respectively, along the count-up into a high level. Accordingly, assuming that the output of the latch 504 maintaines a cycle of thinning designation n2 per every two dots, when the output terminal $O_2$ of the decoder 505 which represents the count value 2 is at a high level, an AND gate 510 is satisfied and the output of a NOR gate 511 assumes a low level. The low level output is input to the clock synchronizing reset terminal SRS of the counter 506. Thus, the counter 506 is reset by the next RCL and after all, the output of the counter 506 repetitively counts 0, 1, 2, 0, 1, 2, .... Also, the output of the NOR gate 511 is input to an AND gate 507 and blocks RCL at the timing of each count value 2. Accordingly, a shift clock signal RSC which is the output of the AND gate 507 ceases at a rate of one clock per every two clocks, as shown. In this state, a read image signal VR is sent from the reader 7 in synchronism with RCL, but data is shifted into a shift register 503 by RSC and therefore, picture elements are thinned at a rate of one dot per every two dots. In FIG. 9, there is shown an output Qn which is most approximate to the input terminal of the shift register 503. As shown, dots V1 and V2 are shifted into the shift register 503, while dot V3 is not shifted into the shift register 503 because of the absence of the clock signal RSC. At the next timing of RSC, dot V4 appears as a read image signal VR and this is shifted into the shift register 503 and therefore, the dot V3 is lost.

A counter circuit 502 is reset by the signal RSP, whereafter it counts the shift clock signal RSC. When the count value thereof has become, for example, 8, a data transfer pulse RXF to a buffer circuit 501 is put out at the output terminal 0 of the counter circuit 502. It is in conformity with a case where the data transfer unit on the bus by the control of DMA 3 is 1 byte that the generation of the data transfer pulse RXF has thus been made into an 8-clock unit. What data is transferred from the shift register 503 to the buffer circuit 501 at this point of time is shown as the 1st memory data in FIG. 9. The content thereof may be shown as dot Nos. 1, 2, 4, 5, 7, 8, 10 and 11 because one dot is thinned per every two dots. The DMA 3 puts out a buffer read signal BR by the buffer full signal BF of the output terminal 0 of the buffer circuit 501 and effects the writing of data into the image memory 4 through the M bus. In this manner, in the thinning designation section, the dots in the main scanning direction are thinning-read. Also, when the thinning is not effected (the photograph area), the thinning designation constant n may be 0. If this is done, the NOR gate 511 is not satisfied and therefore, all the read picture element signal VR is shifted into the shift register and is stored in the image memory 4. In FIG. 8, there is shown a construction for achieving three different thinning rates, but if an AND gate and a decoder output and a latch output input thereto are additionally provided, other thinning rate can be achieved. The foregoing description has been made of the thinning operation with respect to the main scanning direction, but the thinning operation with respect to the sub scanning direction is executed by rendering the image signals of the lines to be thinned invalid in accordance with the designation constant by the soft processing using the MPU 1 which will later be described by reference to FIG. 12(a).

FIG. 12(a) is a flow chart showing the control procedure of the present embodiment executed by the MPU 1 when the thinning process is selectively executed for the image data obtained by reading the image of an original and the image data is stored in the image memory 4. FIG. 12(b) shows the structure of an area map table $2_1$ provided in the memory 2. In FIG. 12(b), PR designates pointers for indicating the area designation data in the line direction by turns. For example, the dot line 0 shown in FIG. 4(b), the thinning converted value $R_1'$ of the first dot line designation input, the thinning converted value $R_2'$ of the next dot line designation input, . . . , and the thinning converted value Rmax of the maximum value of the dot line determined by the sheet size or the like are stored in the addresses indicated by the respective PRS.

In FIG. 12(a), a series of initializations are effected at step S1. That is, the pointer PR, a flag FR for designating the thinning and non-thinning operations in the line direction, a line counter L and a thinning counter I are respectively initialized into 0. At step S2, the arrival of the synchronizing signal RSP from the reader 7 is waited for. At step S3, whether FR is 1 is discriminated. The flag FR is at first initialized into 0 (thinning operation indication) and is alternately reversed so that it assumes 1 when the line counter L reaches the first designated dot line $R_1$, and assumes 0 when the line counter L reaches the next designated dot line $R_2$, and it assumes 1, for example, in the column of the photograph area in accordance with the designation input data. Accordingly, at first, the program proceeds to step S4, at which the data transfer starting address BEG of the DMA 3 is rendered into 0 and the end address END is rendered into a maximum thinning converted value Cmax" in the column direction. At step S5, the thinning designation constant n is set in a reader latch 504, and at step S6, the data sender SOUR of the DMA 3 is made into a reader buffer 501. The data addressee is always the image memory 4. At step S7, the DMA transfer control by the DMA 3 is started. At step S8, the DMA transfer corresponding to one line is terminated and if there is the end interruption of the DMA 3, the program proceeds to step S31 and +1 is effected on the counter I. At step S31, the counter I is examined and, if it is n, the counter I is reset at step S33, and the program proceeds to step S10. That is, the line counter L is reposed once and the next data is over-written into the same dot line of the image memory 4, whereby the data of the preceding line is rendered invalid. Thereby, the thinning in the sub scanning direction is accomplished. If the counter I is not n, the program proceeds to step S9 and +1 is effected on the line counter L. At step S10, whether the line counter L is equal to the maximum value Rmax"+1 of the dot line is discriminated and, if the answer is YES, reading of one-page data is terminated, and if the answer is NO, the program proceeds to step S11. At step S11, whether the line counter L assumes a content $R_1'+1$ indicated by the pointer (PR+1) is discriminated. If the answer is NO, it means the area before the first designated area and therefore the program returns to step S2, and if the answer is YES, the program proceeds to step S12, at which +1 is effected on the pointer PR. This is substantially for the purpose of indicating the next designated dot line $R_2'$. At step S13, whether the flag FR is 1 is discriminated and, if the answer is YES, the flag FR is rendered into 0 at step S15, and if the answer is NO, the flag FR is rendered into 1 at step S14. At first, the flag FR has been 0 (thinning) and therefore, at step S14, the flag FR is rendered into 1 (non-thinning) and the program returns to the initialization) of the counter 1 of step S1. Subsequently, at step S2, FR=1 and therefore, the program proceeds to step S16 and the start address BEG of the DMA 3 is set to 0 and the end address of PMA 3 is set to Cmax. At step S17, n=0 (non-thinning) is sent to the reader latch 504, and then the program proceeds to step S6.

In the manner described above, the image data obtained by reading an original is selectively subjected to the thinning and the non-thinning process by areas in accordance with the area designation and the image data dorresponding to one page is stored in the image memory 4.

The image data stored in the image memory 4 is transmitted from the line interface unit 11 to the host computer 12 through the M bus 15 and selectively via the bus switch 9 or the compression/expansion unit 10.

In the transmission of the image data, a discrimination data indicative of whether the transmitted image data is thinned or not and a data indicative of the thinning rate are also transmitted correspondingly to the area of the image data.

Figure 10:
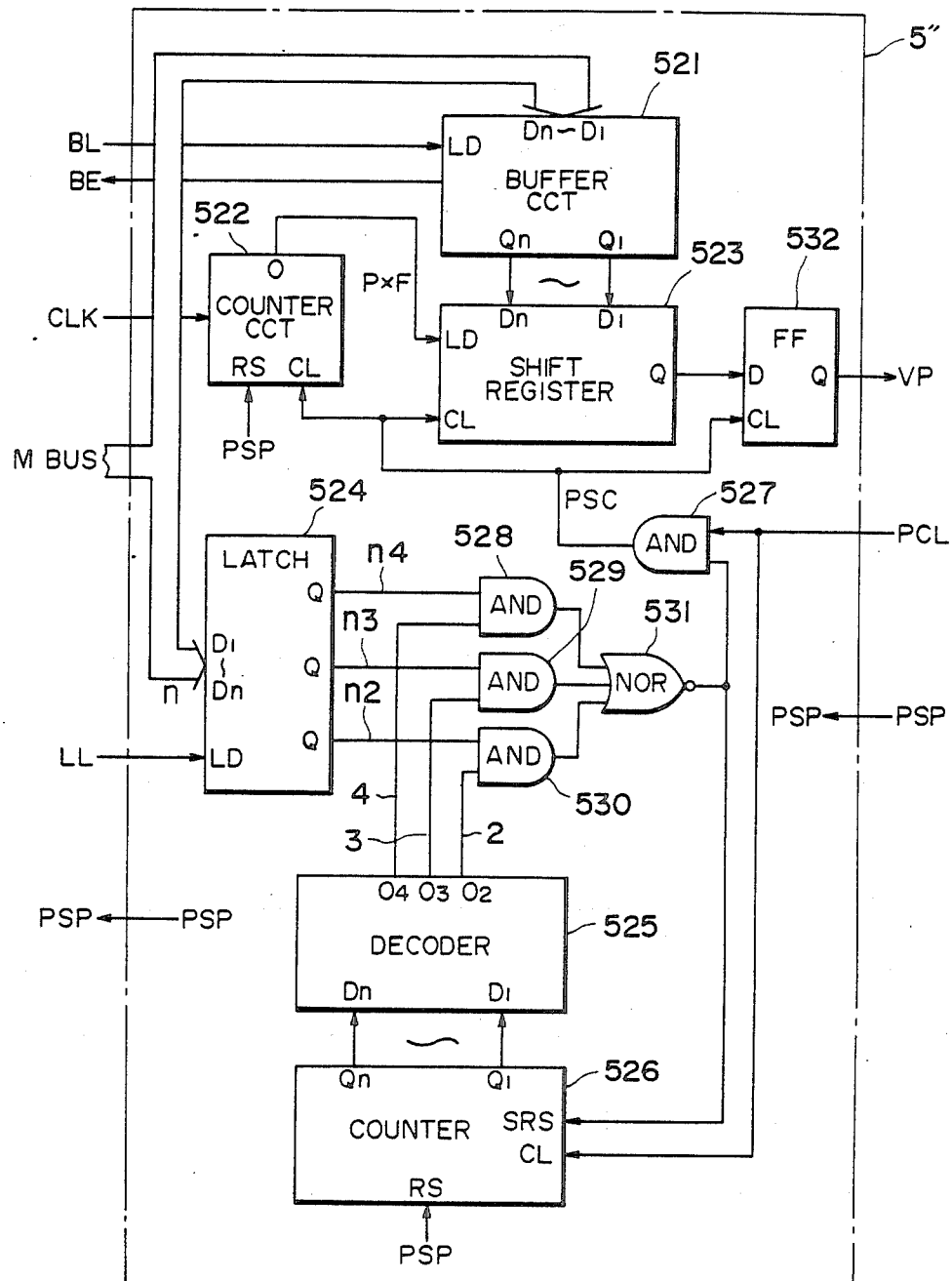
FIG. 10 is a block diagram showing the interface unit 5" of the printer 6 in the input/output control unit 5.
Figure 11:
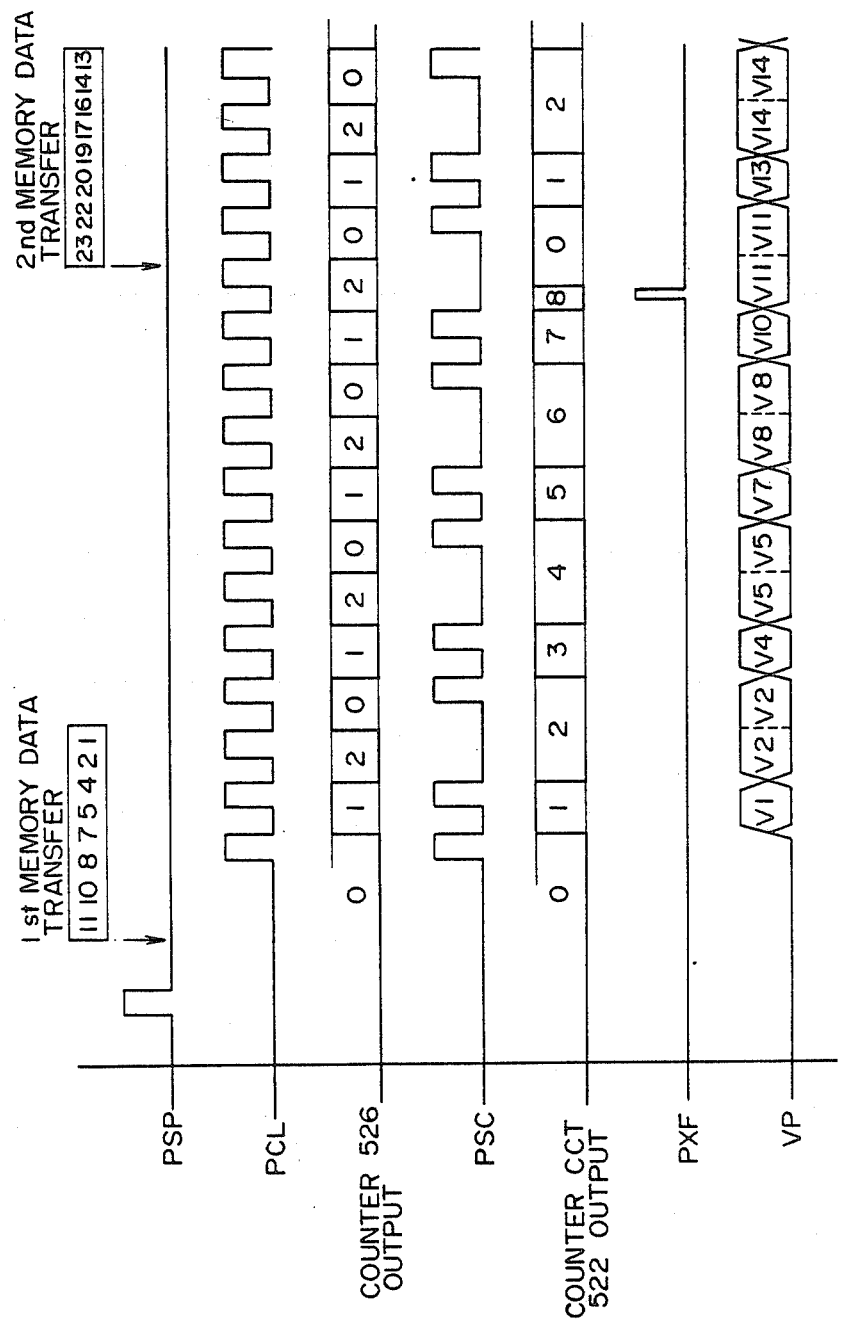
FIG. 11 is a timing chart showing the operation of FIG. 10.

FIG. 10 is a block diagram showing the interface unit 5" of the printer 6 provided in the input/output control unit 5, and FIG. 11 is a timing chart showing the operation of FIG. 10. The false insertion printing operation of the present embodiment will hereinafter be described by reference to FIGS. 10 and 11. In subsequence to a print synchronizing signal PSP for each line (a signal indicative of the arrival of a laser beam at each scanning start point), a series of print picture element clock signals PCL are sent from the printer 6. The counter 506 is reset by the signal PSP and counts up by PCL. On the other hand, an insertion designation constant n corresponding to the thinning rate of the image data is sent in advance from the MPU 1 to a latch 524, and for example, a designated level Q for one cycle of insertion (3/2) per two dots or one cycle of insertion (4/3) per three dots is maintained. The output of a counter 526 is input to a decoder 525, the output of which renders output terminals $O_2$, $O_3$ and $O_4$ corresponding to count values 2, 3 and 4, respectively, into a high level along the count-up. Accordingly, assuming that the output of the latch 524 maintains one cycle of insertion designation n2 per two dots, when the output terminal $O_2$ representative of the count value 2 of the output of the decoder 525 is at a high level, an AND gate 530 is satisfied and the output of a NOR gate 531 assumes a low level. The low level output is input to the clock synchronizing reset terminal SRS of a counter 526. Thus, the counter 526 is reset by the next PCL and after all, the output of the counter 526 repetitively counts 0, 1, 2, 0, 1, 2, . . . Also, the output of the NOR gate 531 is input to an AND gate 527, which thus blocks PCL at the timing of the count value 2. Accordingly, a shift clock signal PSC which is the output of the AND gate 527 reposes at a rate of one clock per every two clocks, as shown. In this state, the already thinned print data indicated as dot numbers 1, 2, 4, 5, 7, 8, 10 and 11 are held in a shift register 523, but the content of the shift register 523 is shifted out by the shift clock signal PSC and therefore, the immediately preceding dot picture element is false-inserted at a rate of one dot per two dots. In FIG. 11, there is shown the output VP of a flip-flop (FF) 532.

A counter circuit 522 is reset by PSP, whereafter it counts the shift clock signal PSC. When the count value thereof has become, for example, 8, the data transfer pulse PXF to the shift register 523 is put out at the output 0 of the counter circuit 522. It is in conformity with a case where the data transfer unit of the DMA 3 is 1 byte that the generation of the data transfer pulse PXF has thus been made into an 8-clock unit. What data is transferred from a buffer circuit 521 to the shift register 523 at this point of time is shown in FIG. 11. The DMA 3 puts out a buffer load signal BL by the buffer empty signal BE of the output of a buffer circuit 521, and effects the writing of data into the buffer circuit 521 through the M bus. In this manner, in the designated section of false insertion, the dots in the main scanning direction are false-inserted. When the insertion is not effected (the photograph area), the designation constant n may be 0. Since the NOR gate 531 is not satisfied, the signal VP of the full picture element data(1, 2, 3, 4, 5, 6, 7, 8) which are not originally thinned is shifted out and printed.

In FIG. 10, there is shown a construction for achieving the restoration of the image data thinned at three different thinning rates, but if an AND gate and a decoder output and a latch output input thereto are additionally provided, the restoration of image data thinned at other thinning rate can also be executed. Also, in FIG. 7, the insertion of the image data with respect to the main scanning direction is effected, but the insertion of the image data with respect to the sub scanning direction can be achieved by over-lappingly reading out the data of the same line from the image memory 4 in accordance with the thinning rate by the soft processing of the MPU 1 of FIG. 13(a) which will later be described.

FIG. 13(a) is a flow chart showing the control procedure of the present embodiment executed by the MPU 1 with respect to a case where the image data stored in the image memory 4 is read out and the image is printed by an output apparatus, and FIG. 13(b) shows the structure of an area map table $2_1$ provided in the memory 2. The false reproduction printing of the present embodiment will hereinafter be described by reference to FIGS. 13(a) and (b). In FIG. 13(a), steps equivalent to those in FIG. 12(a) are given similar reference numerals and need not be described. In FIG. 13(a), at step S20, the synchronizing signal PSP from the printer 6 is waited for. When the signal PSP comes, FR is examined at step S3 and, when FR is 0, the process of expanding the thinned data is executed. That is, at step S4, the data transfer start address BEG of the DMA 3 is rendered into 0 and the end address END is rendered into a maximum thinning converted value Cmax" in the column direction. At step S21, the insertion designation constant n is set in the printer latch 524, and at step S22, the data addressee DEST of the DMA 3 is made into the printer buffer circuit 521. The data sender is always the image memory 4. At step S7, the DMA transfer control by the DMA 3 is started. When FR is 1, the process of intactly transferring the photograph data is executed. That is, at step S16, the start address BEG of the DMA 3 is set to 0 and the end address is set to Cmax. At step S23, n=0 (non-insertion) is sent to the printer latch 524, and then the program proceeds to step S22. At step S22, the data addressee is made into the printer buffer circuit 521, and at step S7, the DMA 3 is started. At step S8, the DMA transfer of the image data corresponding to one line is terminated and, if there is the end interruption of the DMA 3, the program proceeds to step S31, and +1 is effected on the counter I. At step S31, the counter I is examined and, if it is n, the counter I is reset at step S33, and then the program proceeds to step S10. That is, the line counter L is reposed once, and the data of the same line is again read out from the image memory 4, and the same image is double-printed by the printer. Thereby, the insertion of the image with respect to the sub scanning direction is effected. If the counter I is not n, the program proceeds to step S9, at which +1 is effected on the line counter L. The subsequent processing is similar to that of FIG. 12(a).

Design may also be made such that the character area and the photograph area are automatically discriminated by the original image reading signal and the thinning process is selectively effected in accordance with this discrimination.

As described above, the image data is thinning/expansion-processed while being divided, for example, into a photograph image area and a character or figure area and therefore, a high compression/expansion effect is obtained as the entire image without the quality of the image being marred. Moreover, ordinary document data can often be dealt with as a fixed format and therefore, a great effect is obtained simply by effecting the area designation once. In other words, the fixed format is rectangular and permits complicated area designation to be effected, but in many cases, the designation only in the sub scanning direction suffices and therefore, the object can be achieved by a simple construction and operation.

In the present embodiment, as described above, in order to transmit or accumulate an image comprising a mixture of characters, graphs, photographs, etc. efficiently and without reducing the quality of the image, the image on a picture plane is divided into a plurality of areas in accordance with the nature of the image and the thinning and non-thinning processes are selectively effected on each of the areas. Description will now be made of an example in which the reduction in the amount of image data is executed in the construction of FIGS. 1 to 3 by the encoding process, instead of the thinning process.

Figure 14B:
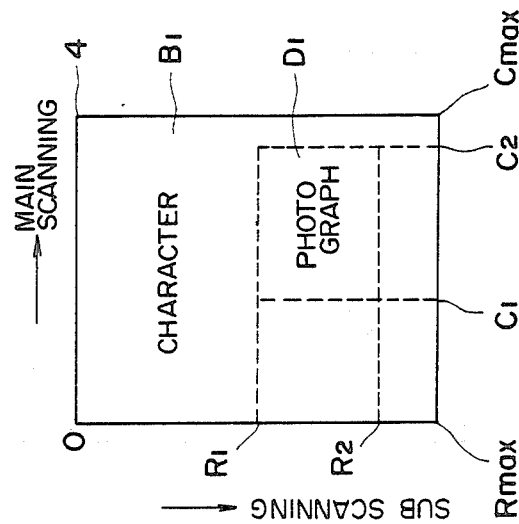
FIGS. 14(a) and 14(b) illustrate the operation and the principle of operation of the apparatus according to the present embodiment.
Figure 14A:
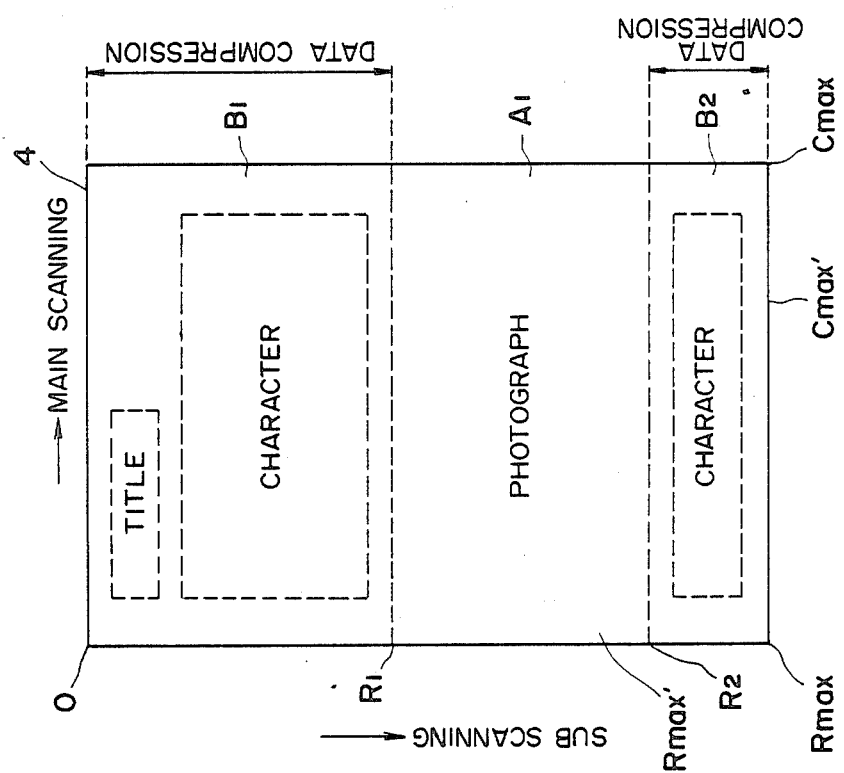

FIGS. 14(a) and (b) illustrate the operation and the principle of operation of the apparatus according to the present embodiment. FIG. 14(a) shows an example of the memory map of the image memory 4 correspondingly to the main scanning and sub scanning directions of the reader 7. Actually, many of document data are often in the form of a fixed format in which characters, figures, photographs, etc. are disposed at predetermined positions, and the natures of the data included therein differ between character data, graph data and photograph data. Of these, character data and graph data are suited for the data compression by the run length encoding method, the MH encoding method or the like, and can result in a high compression/expansion effect ($\frac{1}{8}$-1/40) even by a simple construction. In contrast, photograph data includes half-tones and, unless special processing such as the band compressing method is utilized, a great compression/expansion effect cannot be expected even if the aforementioned run length encoding method or the like is used. Rather, if photograph data is run-length-encoded, it will lead to a bad effect that the data length is lengthened. For this reason, the concept of memory map is introduced and the image data is dealt with while being divided. For example, the image data is divided in such a manner that $B_1$ is a data area comprising characters and figures, $A_1$ is a photograph data area and $B_2$ is a data area comprising characters and figures. When an original matching such a fixed format is to be read from the reader 7, the image data of the areas $B_1$ and $B_2$ are encoded and compressed and the data of the area $A_1$ is intactly utilized without being encoded and compressed, whereby a relatively high data compression effect is obtained as the entire image even if any special compressing means is not provided. This also holds true of the data expansion effect.

Such area designation can be accomplished by the use of the digitizer of the console 8 or a coordinates input mechanism such as a numeric key. That is, if A ($R_1$, $R_2$, ...) is console-input as a memory map designation input, the MPU 1 will receive it through the M bus 15. Here, A means the area designation input in the column direction, $R_1$ in the parentheses indicates the number of lines corresponding to the boundary of the first area, $R_2$ in the parentheses indicates the number of lines corresponding to the boundary of the next area, and ... in the parentheses indicates that inputting may be further continued. The MPU 1 forms the memory map table $2_1$ of the memory 2 in accordance with the area designation data input. If nothing is designated, the whole is the subject area B of data compression, and this is suitable for an original comprising only characters and figures. Of course, various formats of originals can be easily coped with. This is because before the original is read, the photograph area may be estimated and console-input. It can be readily appreciated that there is a sufficient effect even if the estimate is not accurate. Also, the original in this case may be of a size smaller than the image memory 4. At this time, by knowing, for example, the size of the original sheet, the maximum values Rmax and Cmax of the memory map are changed to Rmax' and Cmax', respectively, corresponding to the size of the original.

FIG. 14(b) shows a case where the area designation has been effected also in the column direction (the main scanning direction). The designation method may be similar to that previously described and for example, A ($R_1$, $R_2$, ...) and F ($C_1$, $C_2$, ...) may be console-input. F indicates the area designation input in the column direction, $C_1$ indicates the first dot address, and $C_2$ indicates the next dot address. The apparatus does not compression-process the image data (photograph data) of an area $D_1$ surrounded by $R_1$, $R_2$, $C_1$ and $C_2$, but compression-processes the data of the remaining area $B_1$, thereby enhancing the compression effect as a whole. This also holds true of the data expansion. If the CRT display device 14 provided as an option is caused to depict the memory map, operation will become easier.

FIG. 15(a) is a flow chart showing the control procedure of the present embodiment executed by the MPU 1 when the image data obtained by reading the image of an original is selectively compression-processed and transmitted. FIG. 15(b) shows the structure of a memory map table $2_1$ provided in the memory 2. In FIG. 15(b), PR designates a pointer for indicating the area designation data in the line direction by turns, and PC denotes a pointer for indicating the area designation data in the column direction by turns. A dot line 0, the first dot line designation input $R_1$, the next dot line designation input $R_2$, ..., and the maximum value Rmax of the dot line determined by the sheet size or the like are stored, for example, in the address indicated by the pointer PR. This also holds true of the column direction.

In FIG. 15(a), before the execution of this control, the image data obtained by reading the image of an original is already stored in the image memory 4 by an amount corresponding to one page. At step S41, a series of initializations are effected. That is, the pointer PR, the flag FR for effecting the compression and non-compression controls in the line direction and the line counter L are initialized into 0. At step S42, whether the flag FR is 1 is discriminated. The flag FR is a flag which is at first initialized into 0 and which is alternately reversed so that it assumes 1 when the line counter L reaches the first designated dot line $R_1$, and assumes 0 when the line counter L reaches the next designated dot line $R_2$ and which assumes, for example, in the column of the photograph area in accordance with the designation input data. The flag FC provided in the column direction is also similar to the flag FR. Accordingly, at first, the program proceeds to step S43, at which the data transfer start address BEG of the DMA 3 is rendered into 0 and the end address END is rendered into a maximum value Cmax in the column direction. At step S44, the data addressee DEST of the DMA 3 is made into the compression unit 10. The data sender is always the image memory 4 which has already stored the image data obtained by reading the image of the original. At step S45, the DMA transfer of the image data is started by the DMA 3. That is, the dot line concerned does not include a photograph area and therefore, the image data read out from the image memory 4 is sent to the compression unit 10 and encoded and compressed thereby, and the encoded image data is sent to the host computer 12 through the line interface unit 11. If there is the end interruption of the DMA 3 at step S46, the program proceeds to step S47 and +1 is effected on the line counter L. At step S48, whether the line counter L is equal to the maximum value Rmax+1 of the dot line is discriminated and, if the answer is YES, it means the termination of the processing of one page data, and if the answer is NO, the program proceeds to step S49. At step S49, whether the line counter L assumes the content $R_1+1$ indicated by the pointer (PR+1) is discriminated. If the answer is NO, it means the area preceding the first designated area and therefore the program returns to step S42, and if the answer is YES, the program proceeds to S50 and +1 is effected on the pointer PR. This is substantially for the purpose of indicating the next dot designation line $R_2$. At step S51, whether the flag FR assumes 1 is discriminated and, if the answer is YES, the flag FR is rendered into 0 at step S53, and if the answer is NO, the flag FR is rendered into 1 at step S52. At first, the flag FR was 0 (compression) and therefore, the flag FR is rendered into 1 (non-compression) at step S52, and then the program returns to step S42. At step S42, FR=1 and therefore, the program proceeds to step S54. The actual non-compression area must satisfy not only the conditions of the column but also the conditions in the column direction. At step S54, the pointer PC and the flag FC are initialized into 0. At step S55, the start address BEG of the DMA 3 is set to the content (at first, 0) of the pointer PC and the end address of the DMA 3 is set to the content (at first, $C_1$) of the pointer (PC+1). At step S56, the flag FC is examined and, if FC=1, it means the photograph area and therefore, at step S58, the data addressee DEST by the DMA 3 is made into the bus switch 9 (the compression unit 10 is by-passed.) Also, if FC=0, it means the character and figure area and therefore, at step S57, the data addressee DEST is made into the compression unit 10. At step S59, the DMA 3 is started. If there is the end interruption of the DMA 3 at step S60, whether the column counter C assumes a maximum value Cmax+1 is discriminated at step S61. The value of the column counter C automatically becomes the content of (PC+1) plus 1 due to the termination of the operation of the DMA 3 and therefore, this can be discriminated. If the answer is YES, the program returns to step S47 and enters into the execution of the next dot line. If the answer is NO, +1 is effected on the pointer PC at step S62, and the flag FC is examined at step S63. If FC=1, the flag FC is rendered into 0 at step S66, and the process of inserting, for example, a photograph area end code is effected at step S67. At first, however, FC=0 and therefore, at step S64, the flag FC is rendered into 1, and at step S65, the process of inserting, for example, a photograph area start code is effected. In the external apparatus, an accurate image cannot be reproduced later if whether the sent image data is an encoded compressed data or a non-compressed photograph data cannot be discriminated and therefore, the above-mentioned section code (data) is inserted. The flow returns to step S55, and the processing on one dot line is repeated until the pointer PC indicates substantially Cmax.

In this manner, the image data on the image memory 4 can be sent while or without being encoded and compressed by designated areas. A discrimination data for discriminating at the reception side whether the image data is or is not compressed is transmitted with the image data. If, conversely, the image data sent from the host computer 12 is likewise area-divided, the MPU 1 can detect the section code through the line interface 11 and can automatically select decoding and expanding the subsequent image data through the expansion unit 10 (the case of character and figure data) or directly writing the subsequent image data into the memory 4 through the bus switch 9 (the case of photograph data). Accordingly, the original image data is reproduced in the image memory 4.

The character area and the photograph image area may be automatically discriminated from each other by the original image reading signal and the compression and non-compression controls may be effected by the result of this discrimination.

As described above, the image data is processed while being divided into a photograph image area and a character and figure area as in the embodiment and therefore, when data compression/expansion is to be effected, a high compression/expansion effect is obtained as the entire image. Moreover, ordinary document data can often be dealt with as a fixed format and therefore, a great effect can be obtained simply by designating the areas once. In other words, the fixed format is rectangular and permits complicated area designation to be effected, but in many cases, the designation only in the sub scanning direction suffices and therefore, the object can be achieved by a very simple construction and operation.

While the present invention has been described with respect to a preferred embodiment, it should be understood that the present invention is not restricted thereto but various modifications and changes thereof may be made without departing from the scope of the invention as defined in the appended claims.

We claim:

1. An image information system comprising:
   reading means for photoelectrically reading an image of an original and producing image data;
   means for designating arbitrary area of the image of the original; and
   means for transmitting the image data produced by said reading means, said transmitting means including means for compressing the image data produced by said reading means,
   said transmitting means being operable to transmit image data of either a first area designated by said designating means or a second area other than said first area upon compression of the image data of said either area by said compressing means, and to transmit image data of another area on a non-compression basis.

2. An image information processing system according to claim 1, further comprising memory means for storing therein the image data corresponding to one picture frame produced by said reading means and wherein said transmitting means transmits the image data read out from said memory means.

3. An image information processing system according to claim 1, wherein said transmitting means includes a first signal path for transmission of the image data produced by said reading means through said compressing means and a second signal path for transmission of said image data without passing through said compressing means.

4. An image information processing system according to claim 1, wherein said transmitting transmits the image data to an external apparatus.

5. An image information processing system comprising:
   means for producing image data representative of an image of an original;
   means for transmitting image data to be supplied to an external apparatus;
   first supplying means for compressing image data df a first area of the original produced by said producing means and supplying the comressed image data to said transmitting means; and
   second supplying means for supplying to said transmitting means image data of a second area of the original different from said first area produced by said producing means without compression thereof.

6. An image information processing system according to claim 5, further comprising designating means for designating the first area and the second area of the original.

7. An image information processing system according to claim 5, wherein said producing means comprises means for photoelectrically reading the image of the original and generating the image data.

8. An image information processing system according to claim 5, wherien said producing means comprises means for storing therein the image data corresponding to one picture frame.

9. An image information processing system comprising:
   reading means for photoelectrically reading an image of an original and producing image data;
   means for designating an arbitrary area of the image of the original; and
   means for transmitting the image data produced by said reading means, said transmitting means including means for reducing resolution of the image data produced by said reading means,
   said transmitting means being operable to transmit image data of either a first area designated by said designating means or a second area other than said first area upon reduction of resolution of data of said either area by said reducing means, and to transmit image data of another area without reducing resolution thereof.

10. An image information processing system according to claim 9, wherein said reducing means is capable of reducing the resolution of the image data at a plurality of different rates.

11. An image information processing system according to claim 9, wherein said transmitting means includes memory means for storing one picture frame of image data to be transmitted.

12. An image information processing system according to claim 9, wherein said transmitting transmits the image data to an external apparatus.

13. An image information processing system comprising:
   means for producing image data representative of an image of an original;
   means for transmitting image data to be supplied to an external apparatus;
   first supply means for reducing resolution of the image data of a first area of the original produced by said producing means and supplying the image data reduced in resolution to said transmitting means; and
   second supply means for supplying image data of a second area of the original different from said first area produced by said producing means without reduction of resolution thereof.

14. An image information processing system according to claim 13, further comprising designating means for designating the first area and the second area of the original.

15. An image information processing system according to claim 13, wherein said producing means comprises means for photoelectrically reading the image of the original and generating the image data.

16. An image information processing system according to claim 13, wherein said producing means comprising means for storing therein the image data corresponding to one picture frame.

* * * * *

UNITED STATES PATENT AND TRADEMARK OFFICE
CERTIFICATE OF CORRECTION

PATENT NO. : 4,694,352
DATED : September 15, 1987
INVENTOR(S) : KENZOH INA, ET AL.

It is certified that error appears in the above-identified patent and that said Letters Patent is hereby corrected as shown below:

COLUMN 7

Line 34, "out it" should read --it out--.

COLUMN 9

Line 51, "corrdinates" should read --coordinates--.
    Line 65, "Various" should read --various--.
    Line 67, "If" should read --It--.

COLUMN 10

Line 48, "maintaines" should read --maintains--.

COLUMN 12

Line 44, "initialization)" should read --initialization--.
    Line 55, "dorresponding" should read --corresponding--.

COLUMN 18

Line 39, "information system" should read --information processing system--.

COLUMN 19

Line 2, "transmitting transmits" should read --transmitting means transmits--.
    Line 10, "df" should read --of--.
    Line 12, "comressed" should read --compressed--.
    Line 28, "wherien" should read --wherein--.

UNITED STATES PATENT AND TRADEMARK OFFICE
CERTIFICATE OF CORRECTION

PATENT NO. : 4,694,352
DATED : September 15, 1987
INVENTOR(S) : KENZOH INA, ET AL.

It is certified that error appears in the above-identified patent and that said Letters Patent is hereby corrected as shown below:

COLUMN 20

Line 14, "transmitting transmits" should read
--transmitting means transmits--.
Line 40, "wherein-said" should read --wherein said--.

Signed and Sealed this

Fifteenth Day of March, 1988

Attest:

DONALD J. QUIGG

*Attesting Officer*  *Commissioner of Patents and Trademarks*